(12) United States Patent
Fortl et al.

(10) Patent No.: US 9,759,321 B1
(45) Date of Patent: Sep. 12, 2017

(54) BAND BRAKE ACTUATORS FOR ACTUATING BAND BRAKES ON PLANETARY GEARSETS IN MARINE PROPULSION DEVICES

(71) Applicant: Brunswick Corporation, Lake Forest, IL (US)

(72) Inventors: Karel Fortl, Ceske Budejovice (CZ); Jiri Jager, Prague (CZ); Pavel Korecek, Prague (CZ); Jaroslav Sluncik, Prague Sebrov (CZ); Joseph S. VanSelous, Highland, MI (US)

(73) Assignee: Brunswick Corporation, Lake Forest, IL (US)

( * ) Notice: Subject to any disclaimer, the term of this patent is extended or adjusted under 35 U.S.C. 154(b) by 151 days.

(21) Appl. No.: 14/681,423

(22) Filed: Apr. 8, 2015

(51) Int. Cl.
*F16D 49/00* (2006.01)
*F16H 63/30* (2006.01)
*F16H 3/44* (2006.01)
*F16D 49/10* (2006.01)

(52) U.S. Cl.
CPC ........... *F16H 63/3003* (2013.01); *F16H 3/44* (2013.01); *F16D 49/10* (2013.01)

(58) Field of Classification Search
None
See application file for complete search history.

(56) References Cited

U.S. PATENT DOCUMENTS

| | | | | |
|---|---|---|---|---|
| 1,619,449 A | * | 3/1927 | Waters | F16D 49/10 192/215 |
| 2,682,934 A | * | 7/1954 | Howarth | F16D 49/10 188/77 R |
| 2,854,858 A | * | 10/1958 | Butterfield | F16D 49/10 188/77 R |
| 3,557,911 A | | 1/1971 | Ellard | |
| 4,058,189 A | * | 11/1977 | Chamberlain | F16D 49/10 188/250 F |
| 5,314,044 A | | 5/1994 | Sharp | |

(Continued)

FOREIGN PATENT DOCUMENTS

GB 955002 * 4/1964

OTHER PUBLICATIONS

Unpublished U.S. Appl. No. 14/585,872, filed Dec. 30, 2014.
Unpublished U.S. Appl. No. 14/258,516, filed Apr. 22, 2014.
Unpublished U.S. Appl. No. 14/574,953, filed Dec. 18, 2014.

*Primary Examiner* — Robert A Siconolfi
*Assistant Examiner* — Ryan Dodd
(74) *Attorney, Agent, or Firm* — Andrus Intellectual Proeprty Law, LLP

(57) ABSTRACT

A band brake actuator is for actuating a band brake on a planetary gearset. The band brake actuator comprises a actuator shaft; an output finger; and a linkage assembly. The linkage assembly connects the actuator shaft to the output finger such that rotation of the actuator shaft in a first rotation direction causes the output finger to engage the band brake on the planetary gearset, and such that rotation of the actuator shaft in an opposite, second rotation direction causes the output finger to disengage the band brake from the planetary gearset. Engagement of the band brake and the planetary gearset shifts the planetary gearset into one of a forward and a reverse gear and wherein disengagement of the band brake and the planetary gearset shifts the planetary gearset into a neutral gear.

23 Claims, 18 Drawing Sheets

(56) References Cited

U.S. PATENT DOCUMENTS

| | | | |
|---|---|---|---|
| 6,053,834 A * | 4/2000 | Savoyard | F16D 49/12 188/77 W |
| 6,260,671 B1 | 7/2001 | Fujita | |
| 6,350,165 B1 | 2/2002 | Neisen | |
| 6,435,923 B1 | 8/2002 | Ferguson | |
| 7,267,068 B2 | 9/2007 | Bradley et al. | |
| 7,305,928 B2 | 12/2007 | Bradley et al. | |
| 7,458,866 B2 | 12/2008 | Nakamura et al. | |
| 7,561,886 B1 | 7/2009 | Gonring et al. | |
| 7,891,263 B2 | 2/2011 | Mowbray et al. | |
| 7,942,712 B2 | 5/2011 | Suzuki et al. | |
| 8,100,732 B2 | 1/2012 | Nakamura et al. | |
| 8,105,199 B2 | 1/2012 | Okabe | |
| 8,109,800 B2 | 2/2012 | Okabe et al. | |
| 8,118,701 B2 | 2/2012 | Okabe et al. | |
| 8,157,694 B2 | 4/2012 | Nakamura et al. | |
| 8,246,402 B2 | 8/2012 | Okabe et al. | |
| 8,277,270 B2 | 10/2012 | Ryuman | |
| 8,317,556 B2 | 11/2012 | Suzuki et al. | |
| 8,478,464 B2 | 7/2013 | Arbuckle et al. | |
| 8,777,681 B1 | 7/2014 | McNalley et al. | |
| 8,924,054 B1 | 12/2014 | Arbuckle et al. | |

\* cited by examiner

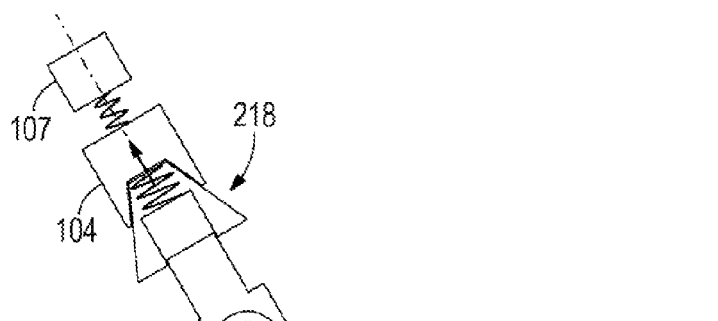
FIG. 21
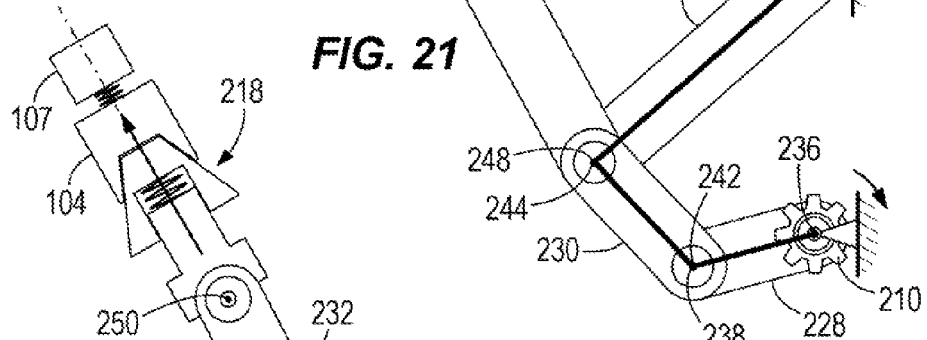
FIG. 22
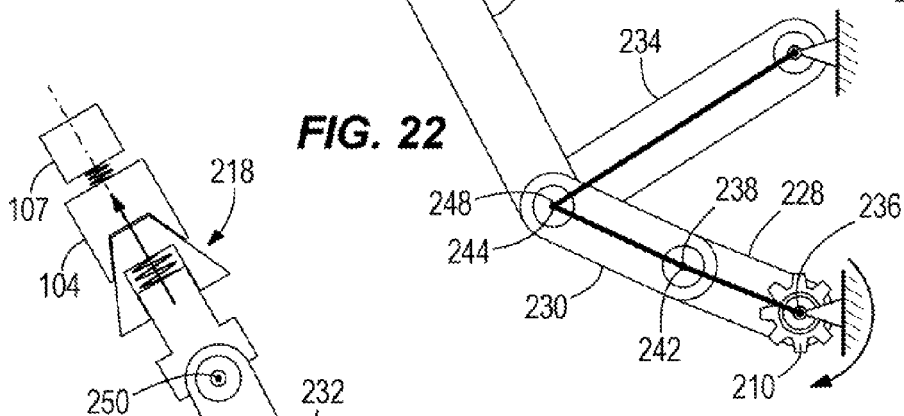
FIG. 23
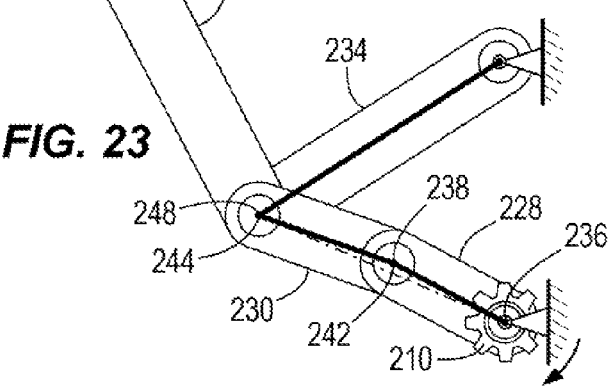

BAND BRAKE ACTUATORS FOR ACTUATING BAND BRAKES ON PLANETARY GEARSETS IN MARINE PROPULSION DEVICES

FIELD

The present disclosure relates to marine propulsion devices, and more particularly to transmission arrangements for marine propulsion devices.

BACKGROUND

The following U.S. Patents are incorporated herein by reference:

U.S. Pat. No. 3,557,911 discloses a band brake having a fixed anchorage at one end and brake actuating means acting on the other hand. The actuating means acts on the band through means exerting a reaction, corresponding to the applying load, on the fixed anchorage, which reaction acts in opposition to the torque load applied to the anchorage by the brake band so as to reduce the resultant load on the anchorage.

U.S. Pat. No. 5,314,044 discloses a brake band retainer mechanism for an automatic washer which ensures that the brake band will be held away from the brake drum when the brake is in the relaxed position, yet will be held close to the drum for ready engagement. A support frame for the brake assembly has four legs, one of the legs pivotally carrying a bracket to which the band is attached, two opposite legs have a flange thereon providing radial and vertical support for the band in its relaxed position, and a fourth, intermediate leg carrying a resilient member which presses against an outer surface of the band to bias the band against the support flange surfaces when the band is relaxed. The resilient member is held on the fourth leg without additional fasteners.

U.S. Pat. No. 6,260,671 discloses a brake band apparatus which is simple in mechanism and improved in the life of a frictional material. A double-wrap brake band apparatus is provided with outer bands having a frictional material secured to the inner peripheral surface thereof, an intermediate band interposed between the outer bands and having a frictional material secured to the inner peripheral surfaces thereof, a coupling portion for coupling one end portion of each of the outer bands and one end portion of the intermediate band in the circumferential direction thereof, an apply bracket integral with or discretely from the coupling portion, a first anchor bracket on the free ends of the outer bands in the circumferential direction thereof, a second anchor bracket on the free end of the intermediate band in the circumferential direction thereof, and an actuator for giving a load in two directions to the apply bracket.

U.S. Pat. No. 6,350,165 discloses an inboard/outboard powered watercraft that incorporates a transmission in its vertical drive unit for providing two forward speeds plus reverse. The transmission is packaged to fit within the vertical drive unit by incorporating a bevel gear apparatus. In one embodiment, the transmission also includes a planetary gear apparatus together with two hydraulic clutches and a ring gear brake. In a second embodiment, three hydraulic clutches are utilized with bevel gears alone to provide the two forward and reverse speeds.

U.S. Pat. No. 6,435,923 discloses a two-speed transmission with reverse gearing for a watercraft. The transmission is disposed in the gimbal housing passing through the transom of the watercraft. A pair of planetary gears shares a common ring gear to provide both forward-reverse and first-second gearing in a very compact package. The transmission housing may be formed in two portions, a first housing containing the forward-reverse gear mechanisms and a second housing containing the first-second gear mechanism. The transmission output shaft is connected to the drive shaft of a vertical drive unit by a double universal joint that may be replaced without disassembling the transmission components.

U.S. Pat. No. 7,458,866 discloses an outboard drive including a prime mover having an output shaft. A driveshaft is coupled with the output shaft. Both shafts having axes that extend at least generally parallel to each other. A propulsion device is coupled with the driveshaft. The prime mover rotates the output shaft to drive the propulsion device through the driveshaft. A speed change mechanism is positioned between the output shaft and the driveshaft. The speed change mechanism changes a rotational speed of the output shaft transmitted to the driveshaft.

U.S. Pat. No. 7,891,263 discloses a two speed transmission system mounted for driving a marine craft comprising: an input shaft coupled in direct connection with a driveshaft of an engine of the marine craft; an output shaft coaxial with the input shaft coupled in direct connection with a driveline of the marine craft; a first gear train for transmitting drive at a fixed first gear ratio; a second gear train for transmitting drive at a fixed second gear ratio; a first friction clutch operable to engage/disengage the first gear train; and a second friction clutch operable to engage/disengage the second gear train, wherein in shifting between the first gear ratio and the second gear ratio one of the friction clutches is disengaged using controlled slippage while the other friction clutch is engaged using controlled slippage.

U.S. Pat. No. 7,942,712 discloses an outboard motor that includes a power source, a boat propulsion section, a shift position switching mechanism, a clutch actuator, and a control device. The shift position switching mechanism switches among a first shift position in which a first clutch is engaged and a second clutch is disengaged, a second shift position in which the first clutch is disengaged and the second clutch is engaged, and a neutral position in which both the first clutch and the second clutch are disengaged. When a gear shift is to be made from the first shift position to the second shift position, the control section causes the clutch actuator to gradually increase an engagement force of the second clutch. The outboard motor reduces the load to be applied to the power source and the power transmission mechanism at the time of a gear shift in a boat propulsion system including an electronically controlled shift mechanism.

U.S. Pat. No. 8,109,800 discloses a transmission device that includes hydraulic type transmission mechanisms arranged to change the speed or the direction of rotation of an engine, and hydraulic pressure control valves arranged to control hydraulic pressure supplied to the hydraulic type transmission mechanisms. The hydraulic pressure control valves are disposed on one side or the other side in the watercraft width direction. The transmission device provides an outboard motor capable of securing cooling characteristics of a hydraulic pressure control valve without incurring complexity in structure and increase in cost.

U.S. Pat. No. 8,157,694 discloses an outboard motor having a power transmission mechanism for transmitting power of an engine to a propeller. The power transmission mechanism has a transmission ratio changing unit having a planetary gear train including a sun gear, planetary gears, and an internal gear. The internal gear is connected to an input side shaft on the engine side. The planetary gears are connected to an output side shaft on the propeller side. The sun gear is connected to a stationary portion via a one-way clutch. The planetary gears and the internal gear and/or the sun gear are connected by an on-off clutch. When the on-off clutch is disengaged, the one-way clutch is engaged and the speed from the input side shaft is outputted from the output side shaft with a reduced speed. When the on-off clutch is engaged, the speed from the input side shaft is outputted from the output side shaft with the same speed.

U.S. Pat. No. 8,277,270 discloses a boat propulsion unit that includes a power source, a propeller, a shift position switching mechanism, a control device, and a retention switch. The propeller is driven by the power source to generate propulsive force. The shift position switching mechanism has an input shaft connected to a side of the power source, an output shaft connected to a side of the propeller, and clutches that change a connection state between the input shaft and the output shaft. A shift position of the shift position switching mechanism is switched among forward, neutral, and reverse by engaging and disengaging the clutches. The control device adjusts an engagement force of the clutches. The retention switch is connected to the control device. When the retention switch is turned on by an operator, the control device controls the engagement force of the clutches to retain a hull in a predefined position. The boat propulsion unit provides a boat propulsion unit that can accurately retain a boat at a fixed point.

U.S. Pat. No. 8,317,556 discloses a boat propulsion system that includes a power source, a propulsion section, a shift position switching mechanism arranged to switch among a first shift position, a second shift position, and a neutral position, a gear ratio switching mechanism, an actuator, and a control section. When switching is to be performed from the neutral position to the first shift position and the high-speed gear ratio, the control section is arranged to cause the actuator to, maintain the low-speed gear ratio, switch to the first shift position, and then establish the high-speed gear ratio when the current gear ratio of the gear ratio switching mechanism is the low-speed gear ratio, and cause the actuator to establish the low-speed gear ratio before switching to the first shift position, switch to the first shift position, and then establish the high-speed gear ratio when the current gear ratio of the gear ratio switching mechanism is the high-speed gear ratio. This arrangement improves the durability of a power source and a power transmission mechanism in a boat propulsion system including an electronically controlled shift mechanism.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

In certain examples, a band brake actuator is for actuating a band brake on a planetary gearset. The band brake actuator can be designed for use in a transmission for a marine propulsion device. The band brake actuator comprises an actuator shaft; an output finger; and a linkage assembly. The linkage assembly connects the actuator shaft to the output finger such that rotation of the actuator shaft in a first rotation direction causes the output finger to engage the band brake on the planetary gearset, and such that rotation of the input shaft in an opposite, second rotation direction causes the output finger to disengage the band brake from the planetary gearset. Engagement of the band brake and the planetary gearset shifts the planetary gearset into one of a forward and a reverse gear and disengagement of the band brake and the planetary gearset shifts the planetary gearset into a neutral gear.

BRIEF DESCRIPTION OF THE DRAWINGS

The present disclosure is described with reference to the following Figures. The same numbers are used throughout the Figures to reference like features and like components.

FIGS. 21-23 schematically depict the forward band brake actuator as it moves past an over-centered position shown in FIG. 22.

DETAILED DESCRIPTION OF THE DRAWINGS

In the present description, certain terms have been used for brevity, clarity, and understanding. No unnecessary limitations are to be inferred therefrom beyond the requirement of the prior art because such terms are used for descriptive purposes only and are intended to be broadly construed. Each of the examples of systems and methods provided in the FIGURES and in the following description can be implemented separately, or in conjunction with one another and/or with other systems and methods.

Figure 1:
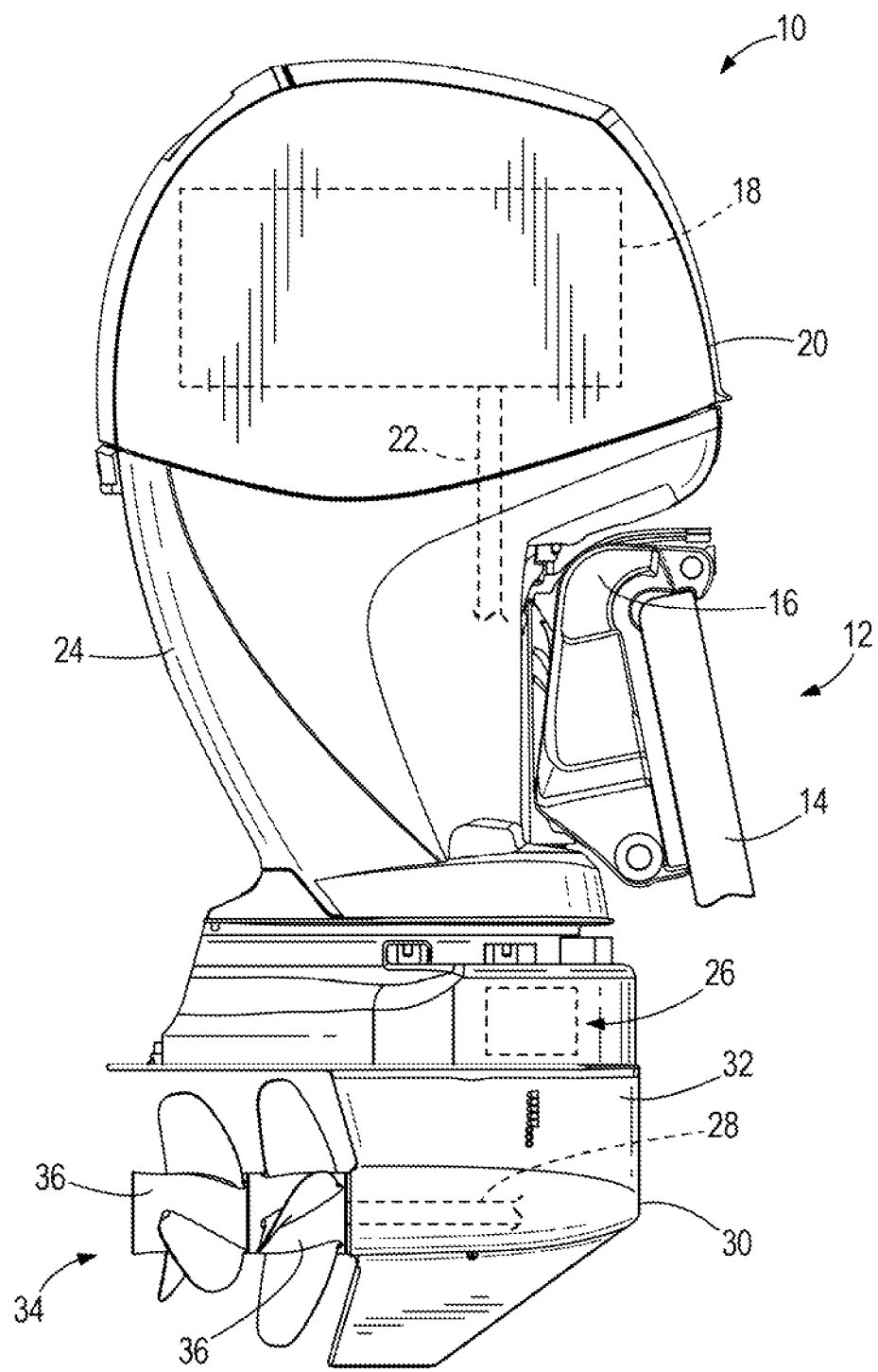
FIG. 1 is a side view of an outboard marine propulsion device.

FIG. 1 depicts an outboard marine propulsion device 10 for propelling a marine vessel 12 in water. The marine propulsion device 10 is connected to the transom 14 of the marine vessel 12 by a transom bracket 16. As is conventional, the marine propulsion device 10 includes an internal combustion engine 18 located within an upper cowling 20.

The engine 18 causes rotation of a drive shaft 22 that extends downwardly from the engine 18 through a driveshaft housing 24. A transmission 26 relays rotational force from the driveshaft 22 to a propulsor shaft 28 located in a propulsor shaft housing 30. The transmission 26 is located in or above a gearcase housing 32, which is disposed beneath the driveshaft housing 24. Rotation of the propulsor shaft 28 causes rotation of a propulsor 34, which in this example includes counter rotating propellers 36. The type of propulsor 34 can vary from that which is shown, and in other examples can include single or multiple propellers or single or multiple impellers, and/or the like.

Embodiments of the transmission 26 are shown in FIGS. 2-12. Referring to FIGS. 2-6, the transmission 26 includes an input shaft 38 that is driven into rotation by the engine 18. The input shaft 38 can be the drive shaft 22 or an extension of the drive shaft 22 such that rotation of the drive shaft 22 causes concurrent rotation of the input shaft 38. The transmission 26 also includes an output shaft 40 that is connected to the propulsor shaft 28 via for example a conventional gearset (not shown) such that rotation of the output shaft 40 causes concurrent rotation of the propulsor shaft 28. The input shaft 38 and output shaft 40 are connected together by forward and reverse planetary gearsets 42, 44 such that the input shaft 38 and output shaft 40 are coaxially aligned.

As will be described in more detail herein below, the forward planetary gearset 42 connects the input shaft 38 to the output shaft 40 so as to drive the output shaft 40 into forward rotation. The reverse planetary gearset 44 connects the input shaft 38 to the output shaft 40 so as to drive the output shaft 40 into reverse rotation. The forward and reverse planetary gearsets 42, 44 both provide the same speed reduction from the input shaft 38 to the output shaft 40. In one non-limiting example, the nominal reduction is 1.68:1. A forward brake 46 engages the forward planetary gearset 42 in forward gear so as to drive the output shaft 40 into the forward rotation. A reverse brake 48 engages the reverse planetary gearset 44 in reverse gear so as to drive the output shaft 40 into the reverse rotation. Actuation of neither of the forward brake 46 and reverse brake 48 actuates a neutral gear wherein the output shaft 40 is disconnected from the input shaft 38.

Referring to FIGS. 3-6, the forward planetary gearset 42 includes a forward ring gear 50 that is fixed to and rotates with the input shaft 38. The forward ring gear 50 and the input shaft 38 can be formed together as one piece or can be separate pieces that are connected together. The forward ring gear 50 includes a radially inwardly facing gear surface 52. The forward planetary gearset 42 also includes a forward sun gear 54 that is disposed on the output shaft 40. The forward sun gear 54 has a radially outwardly facing gear surface 56 and a radially inwardly facing bearing surface 58. The radially inwardly facing bearing surface 58 bears on the output shaft 40 such that the forward sun gear 54 is rotatable with respect to the output shaft 40, and vice verse. The type of bearing surface can vary and in this example includes roller bearings 59. The forward planetary gearset 42 further includes a forward brake drum 60 that rotates with the forward sun gear 54. The forward brake drum 60 can be formed as one component with the forward sun gear 54 or the forward brake drum 60 can be a separate component that is attached to the forward sun gear 54.

The forward planetary gearset 42 further includes a plurality of forward planet gears 62 that are rotatable about their own center axis 64 and that are radially disposed between the forward ring gear 50 and the forward sun gear 54. Each forward planet gear 62 has a radially outwardly facing gear surface 66 that is engaged with the radially inwardly facing gear surface 52 of the forward ring gear 50 and the radially outwardly facing gear surface 56 of the forward sun gear 54. The forward planetary gearset 42 further includes a forward carrier 68 that retains the plurality of forward planet gears 62 so that the forward planet gears 62 are rotatable about their own center axis 64. The forward carrier 68 is fixed to and rotates with the output shaft 40 and is rotatable with respect to the forward ring gear 50 and the forward sun gear 54. The manner of connection between the forward carrier 68 and the output shaft 40 can vary. In this example, a first plurality of splines 70 are formed on a radially inwardly facing surface 71 of the forward carrier 68 and engage with a second plurality of splines 72 on a radially outer surface 73 of the output shaft 40.

The reverse planetary gearset 44 includes a reverse sun gear 74 that is fixed to and rotates with the input shaft 38. The reverse sun gear 74 can be formed as one component with the input shaft 38 or formed separately from and connected to the input shaft 38. The reverse sun gear 74 has a radially outwardly facing gear surface 76. The reverse planetary gearset 44 also has a reverse ring gear 78 that is fixed to and rotates with the forward carrier 68. The reverse ring gear 78 and the forward carrier 68 can be formed as one component or separate components that are connected together. In this example, the reverse ring gear 78 has peripheral tabs 80 that are received in peripheral recesses 82 that are circumferentially spaced apart on the outer radius of the forward carrier 68. The reverse ring gear 78 includes a radially inwardly facing gear surface 84.

The reverse planetary gearset 44 further includes a plurality of reverse planet gears 86 that are rotatable about their own center axis 88 and that are radially disposed between the reverse ring gear 78 and the reverse sun gear 74. Each reverse planet gear 86 has a radially outwardly facing gear surface 90 that is engaged with the radially inwardly facing gear surface 84 of the reverse ring gear 78 and the radially outwardly facing gear surface 76 of the reverse sun gear 74. The reverse planetary gearset 44 also has a reverse carrier 92 that retains the reverse planet gears 86 so that the reverse planet gears 86 can rotate about their own center axis 88. The reverse carrier 92 is rotatable with respect to the reverse ring gear 78 and the reverse sun gear 74. A reverse brake drum 94 is fixed to and rotates with the reverse carrier 92. The reverse brake drum 94 and reverse carrier 92 can be formed as a single component or can be separate components that are connected together. Pluralities of bearings 97, 99 (see FIGS. 10-12), such as roller bearings, support the reverse planetary gearset 44 with respect to the output shaft 40.

Figure 7:
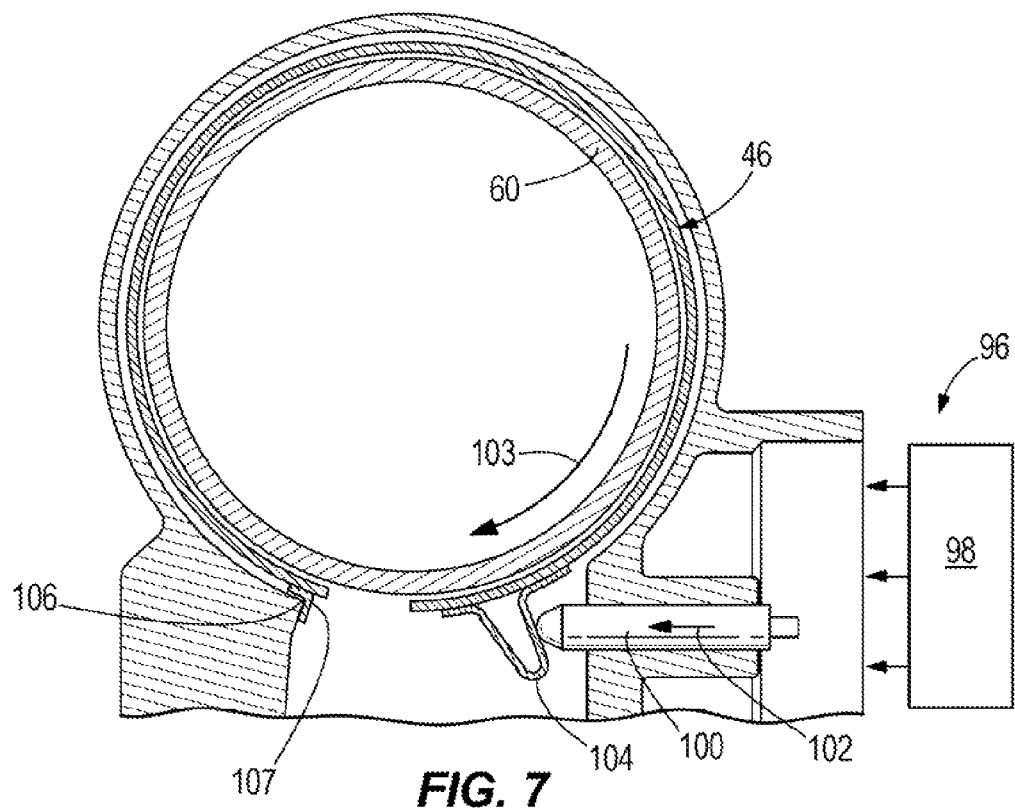
FIG. 7 is a top view of a brake for the transmission.
Figure 8:
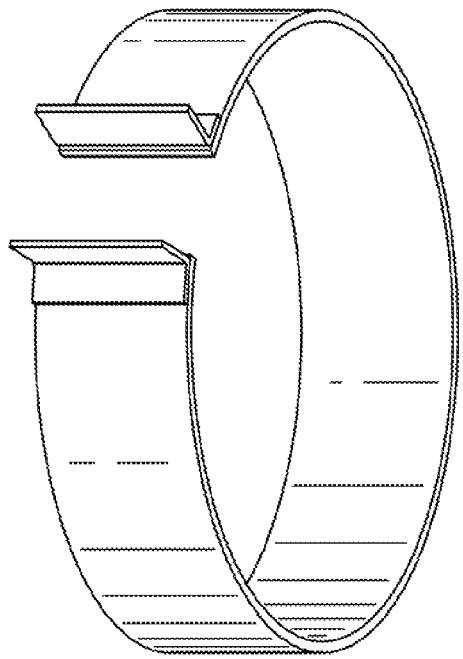
FIG. 8 is a perspective view of a band brake for the transmission.
Figure 9:
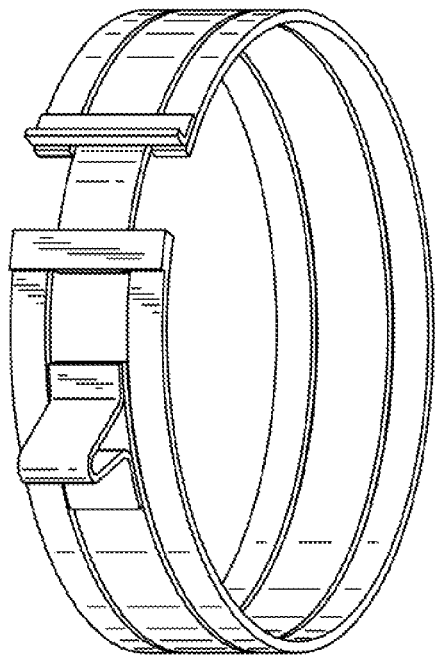
FIG. 9 is a perspective view of another type of band brake for the transmission.

Referring to FIGS. 7-9, the exact construction of the forward and reverse brakes 46, 48 can vary. In certain examples the forward and reverse brakes 46, 48 are conventional single-wrapped band brakes, as shown in FIG. 8. In certain examples the forward and reverse brakes 46, 48 are conventional double-wrapped band brakes, as shown in FIG. 9. The functionality of single-wrapped band brakes and double-wrapped band brakes generally is the same except the torque capability of the double-wrapped band brakes is higher than the single-wrapped band brakes for the same actuation force. In the example of FIGS. 2-6, the forward and reverse brakes 46, 48 are wrapped around and act on the forward and reverse brake drums 60, 94. Tightening the band brake prevents rotation of the brake drum. Loosening the band brake allows rotation of the brake drum. FIG. 7 depicts one example wherein the forward brake 46 is a double-wrapped band brake that is wrapped around the forward brake drum 60. The reverse brake 48 and reverse brake drum 94 can be configured in the same manner. An actuator 96 is configured to actuate the forward and reverse brakes 46, 48. The type of actuator can vary from that which is shown. In this example, the actuator 96 includes a servo-motor 98 that moves a pin 100 in the direction of arrow 102 against an apply bracket 104 disposed at one end of the forward brake 46. The other end of the forward brake 46 is fixed to a gearcase housing 106 at an anchor bracket 107. Movement of the pin 100 in the direction of arrow 102 tightens the forward brake 46 about the brake drum 60, thus preventing the brake drum 60 from rotating. In this example, the forward and reverse brakes 46, 48 are self-energized, which means that the direction of rotation of the forward and reverse brake drums 60, 94 (as shown at arrow 103) is the same as the direction of actuation shown at arrow 102. Thus, rotation of the brake drums 60, 94 assists actuation of the forward and reverse brakes 46, 48. Movement of the pin 100 opposite the direction of arrow 102 loosens the forward brake 46 with respect to the brake drum 60, thus allowing the brake drum 60 to rotate.

Figure 10:
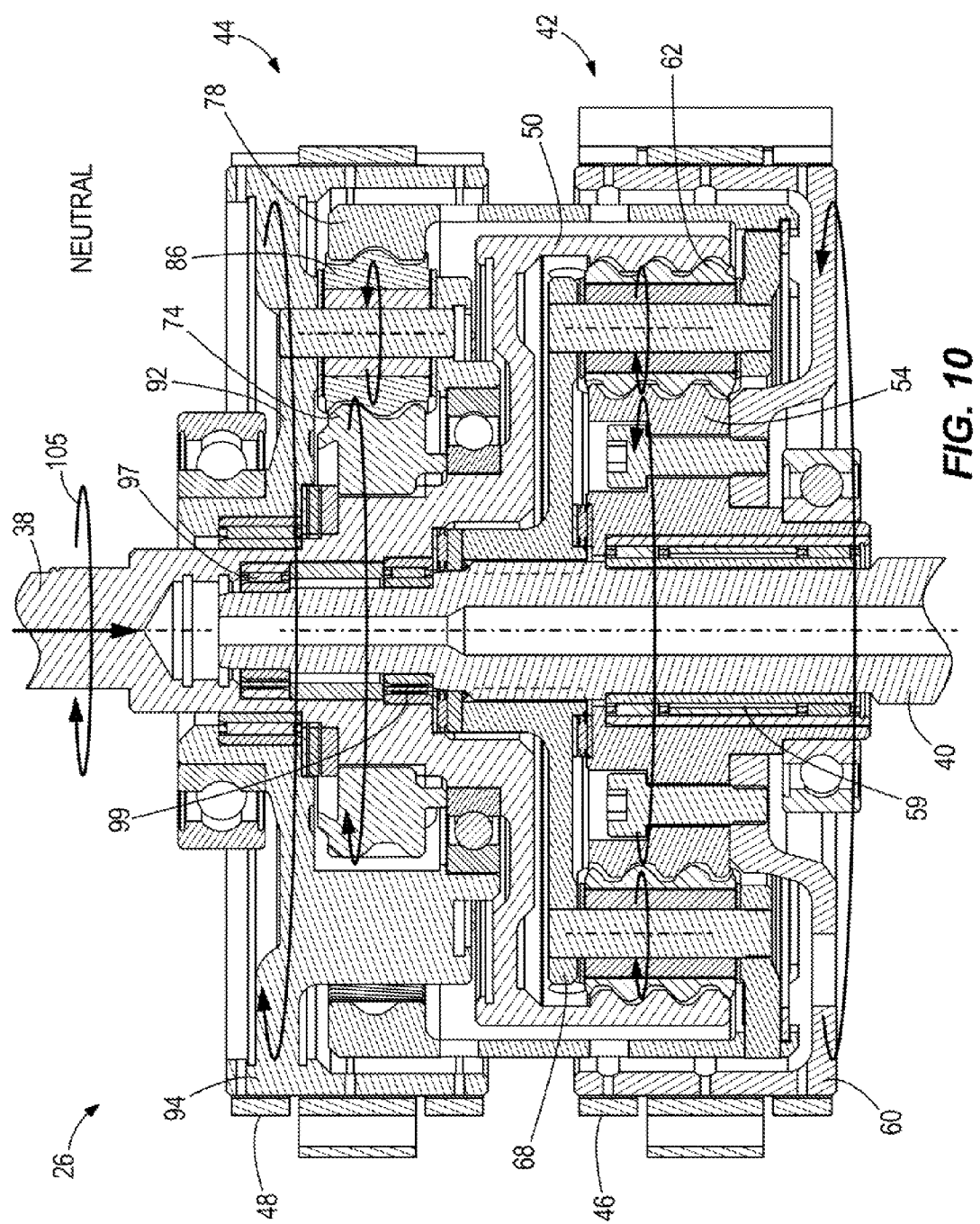
FIG. 10 is a view of section 10-10 taken in FIG. 2, showing the transmission in neutral gear.
Figure 11:
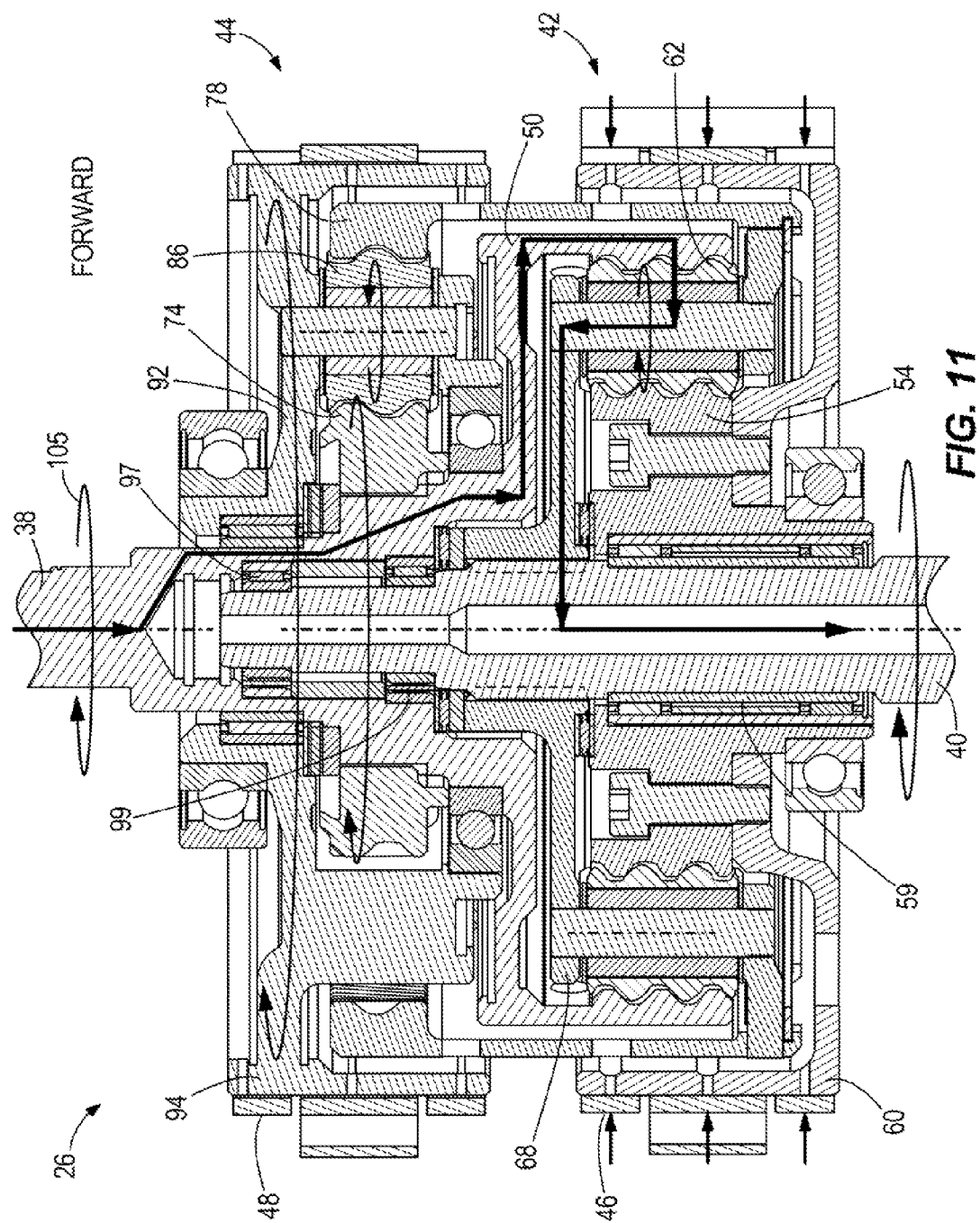
FIG. 11 is a view of section 10-10 taken in FIG. 2, showing the transmission in forward gear.
Figure 12:
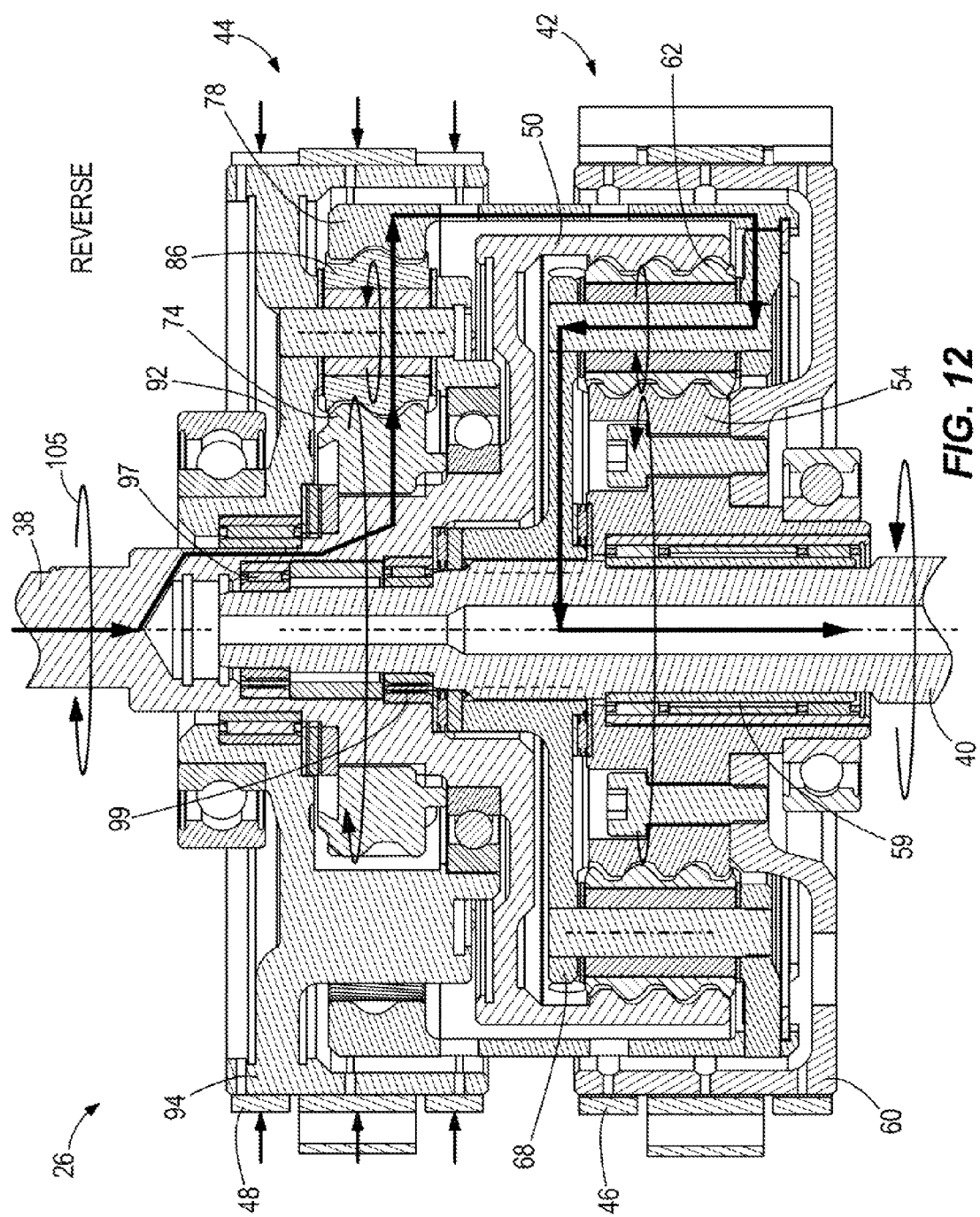
FIG. 12 is a view of section 10-10 taken in FIG. 2, showing the transmission in reverse gear.

Referring to FIGS. 10-12, the transmission 26 is able to engage the input shaft 38 with the output shaft 40 in neutral, forward and reverse gears. FIG. 10 shows the transmission 26 in neutral gear, wherein rotation of the input shaft 38 does not cause rotation of the output shaft 40. In the neutral gear, neither of the forward and reverse brakes 46, 48 are tightened about the brake drums 60, 94. That is, the actuator 96 has not moved the pin 100 in the direction of arrow 102. As such, both brake drums 60, 94 are free to rotate. Thus forward rotation of the input shaft 38 (shown at arrow 105) causes forward rotation of the reverse sun gear 74 and forward ring gear 50. The forward rotation of the reverse sun gear 74 causes reverse rotation of the reverse planet gears 86, which in turn causes forward rotation of the reverse carrier 92 and reverse brake drum 94. The forward rotation of the forward ring gear 50 causes reverse rotation of the forward planet gears 62, which causes reverse rotation of the forward brake drum 60. The forward carrier 68 and output shaft 40 remain stationary. The rotation of the input shaft 38 is not translated to the output shaft 40.

FIG. 11 depicts the transmission 26 in forward gear, wherein the forward brake 46 is actuated by the actuator 96 so as to move the pin 100 in the direction of arrow 102, which as described herein above, holds the forward brake drum 60 and forward sun gear 54 stationary. Forward rotation of the input shaft 38 (at 105) causes forward rotation of the forward ring gear 50, which in turn causes forward rotation of the plurality of forward planet gears 62 and forward rotation of the forward carrier 68 and output shaft 40. The forward rotation of the reverse sun gear 74 also results in reverse rotation of the plurality of reverse planet gears 86 and forward rotation of the reverse carrier 92 and reverse brake drum 94.

FIG. 12 shows the transmission 26 in reverse gear, wherein the actuator 96 moves the pin 100 in the direction of arrow 102, which as described herein above, holds the reverse brake drum 94 and reverse carrier 92 stationary. This prevents the plurality of reverse planet gears 86 from rotating about the reverse sun gear 74. Forward rotation of the input shaft 38 (at 105) causes forward rotation of the reverse sun gear 74, which causes reverse rotation of the plurality of reverse planet gears 86 about their own center axis 88, which causes reverse rotation of the reverse ring gear 78, which in turn causes reverse rotation of the forward carrier 68 and the output shaft 40.

In can thus be seen that rotation of the input shaft 38 simultaneously directly powers both of the forward and reverse planetary gearsets 42, 44. More specifically, rotation of the input shaft 38 simultaneously, directly powers the forward planetary gearset 42 via the forward ring gear 50 and the reverse planetary gearset 44 via the reverse sun gear 74.

Figure 2:
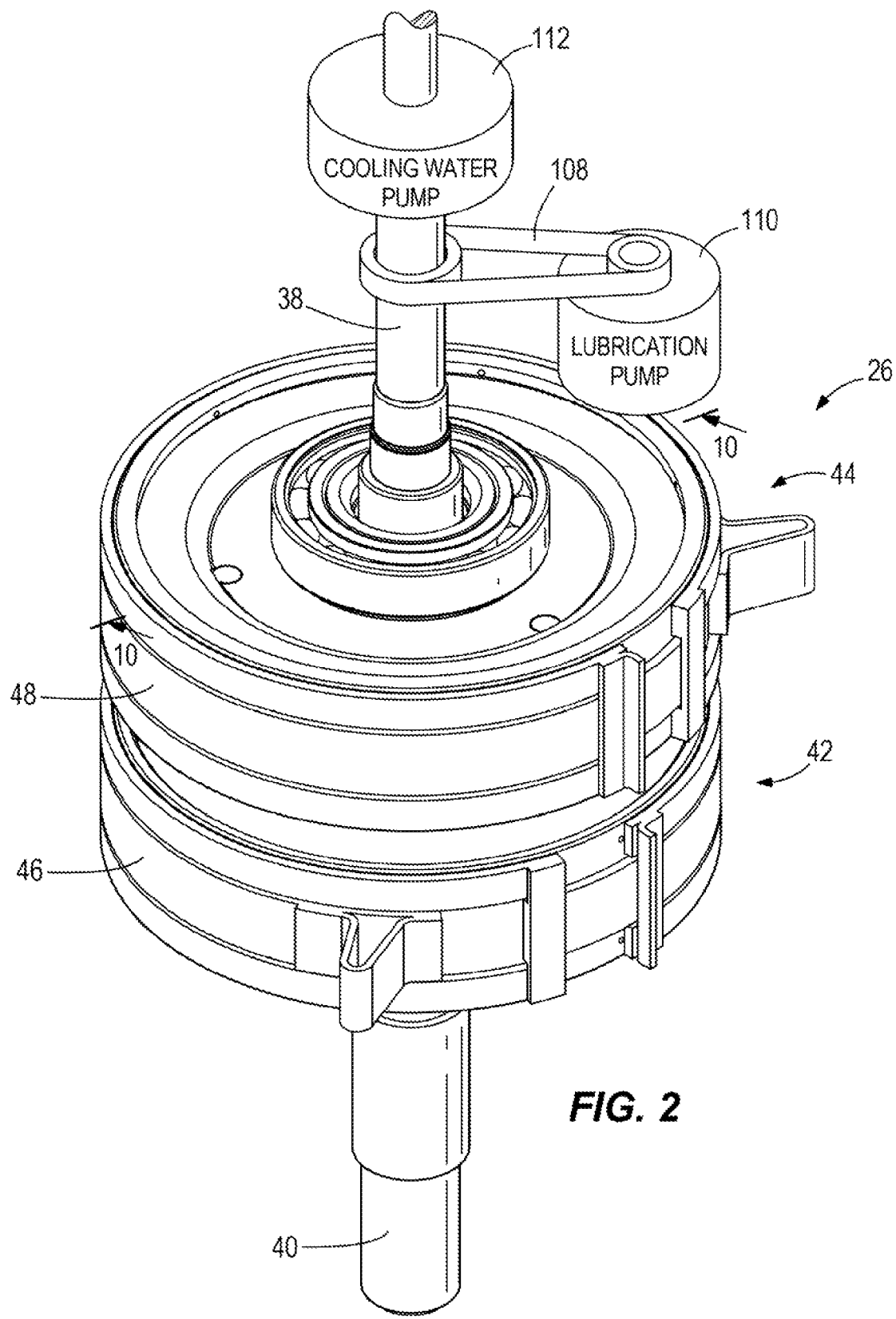
FIG. 2 is a perspective view of a transmission for the outboard marine propulsion device.
Figure 3:
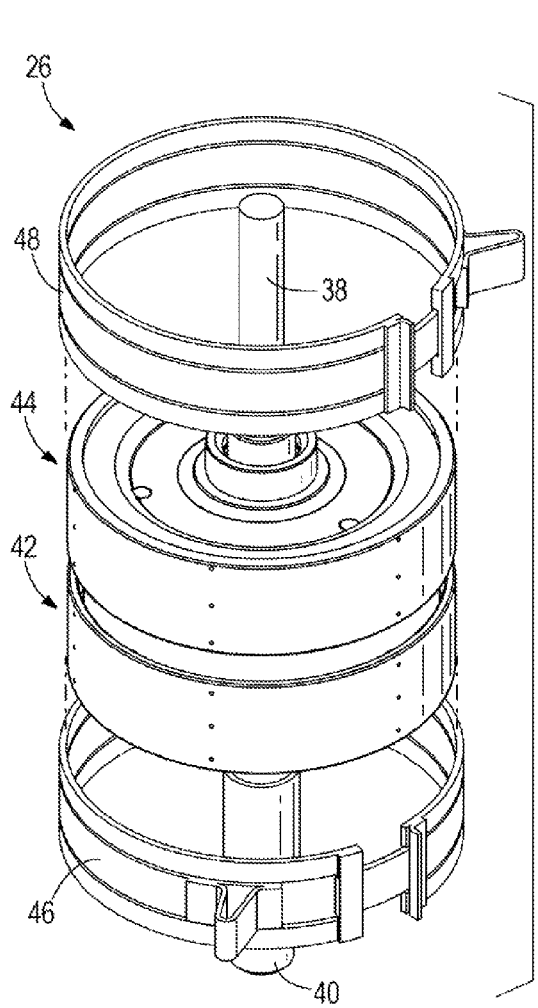
FIGS. 3-6 are exploded views of the transmission.
Figure 4:
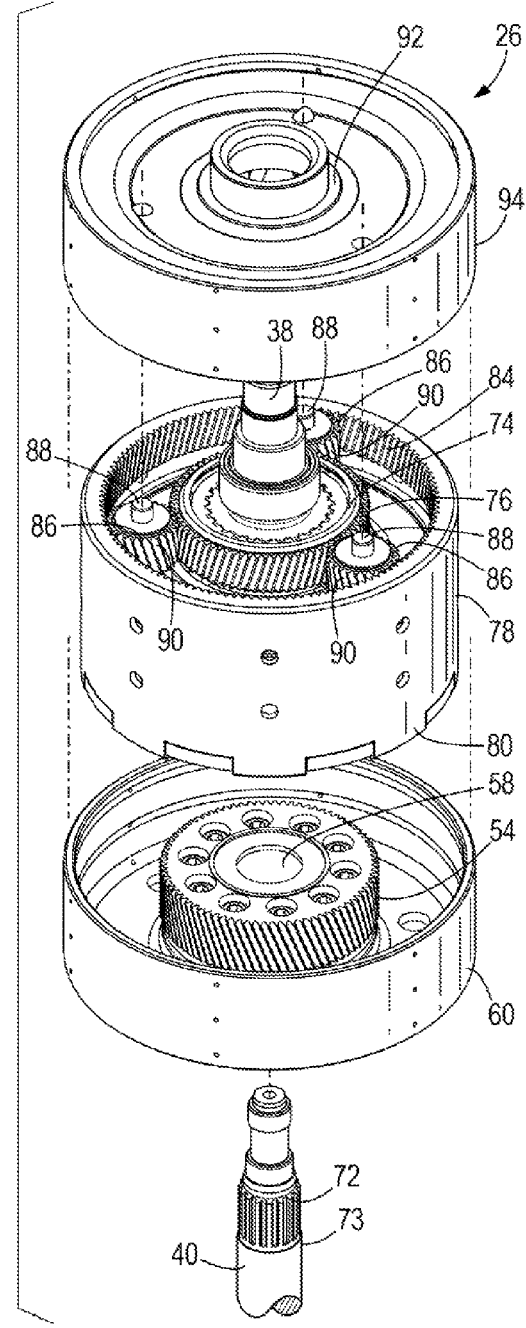
Figure 5:
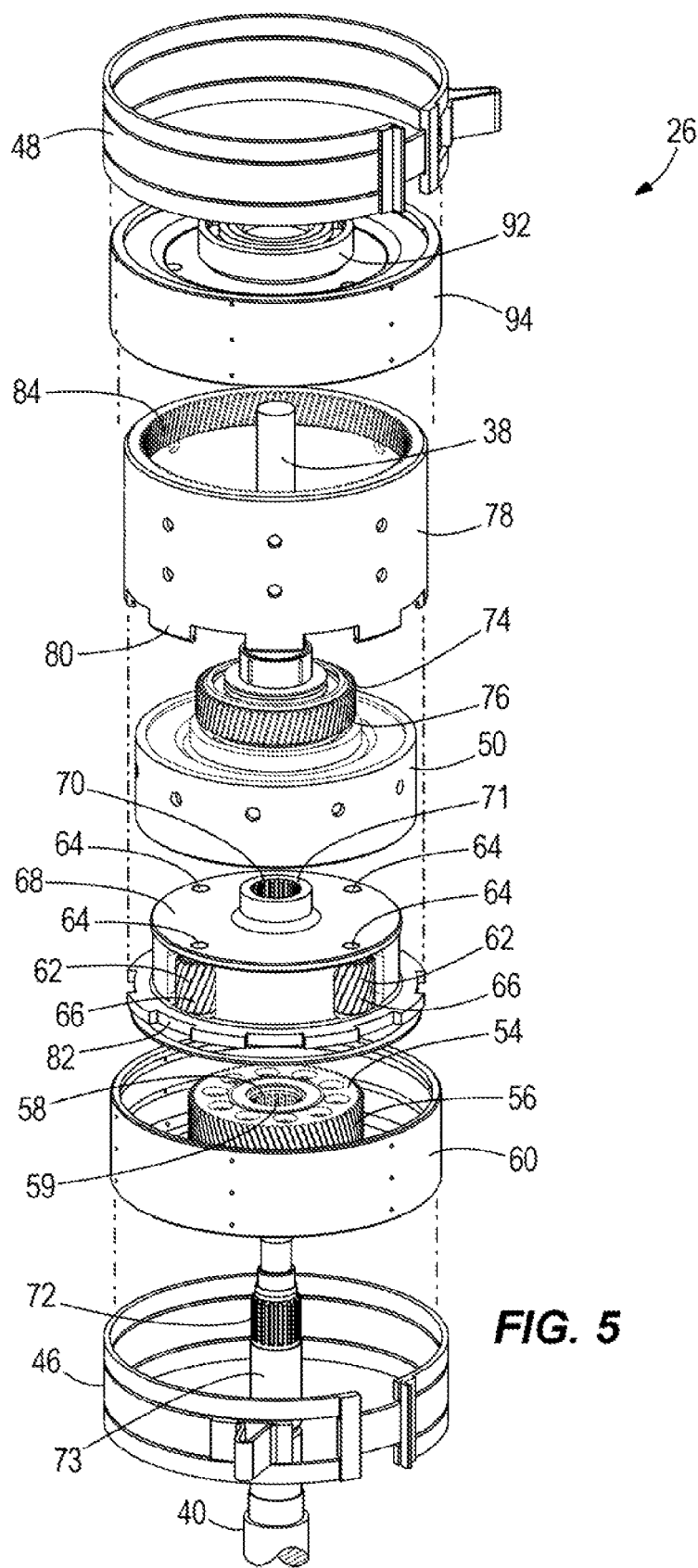
Figure 6:
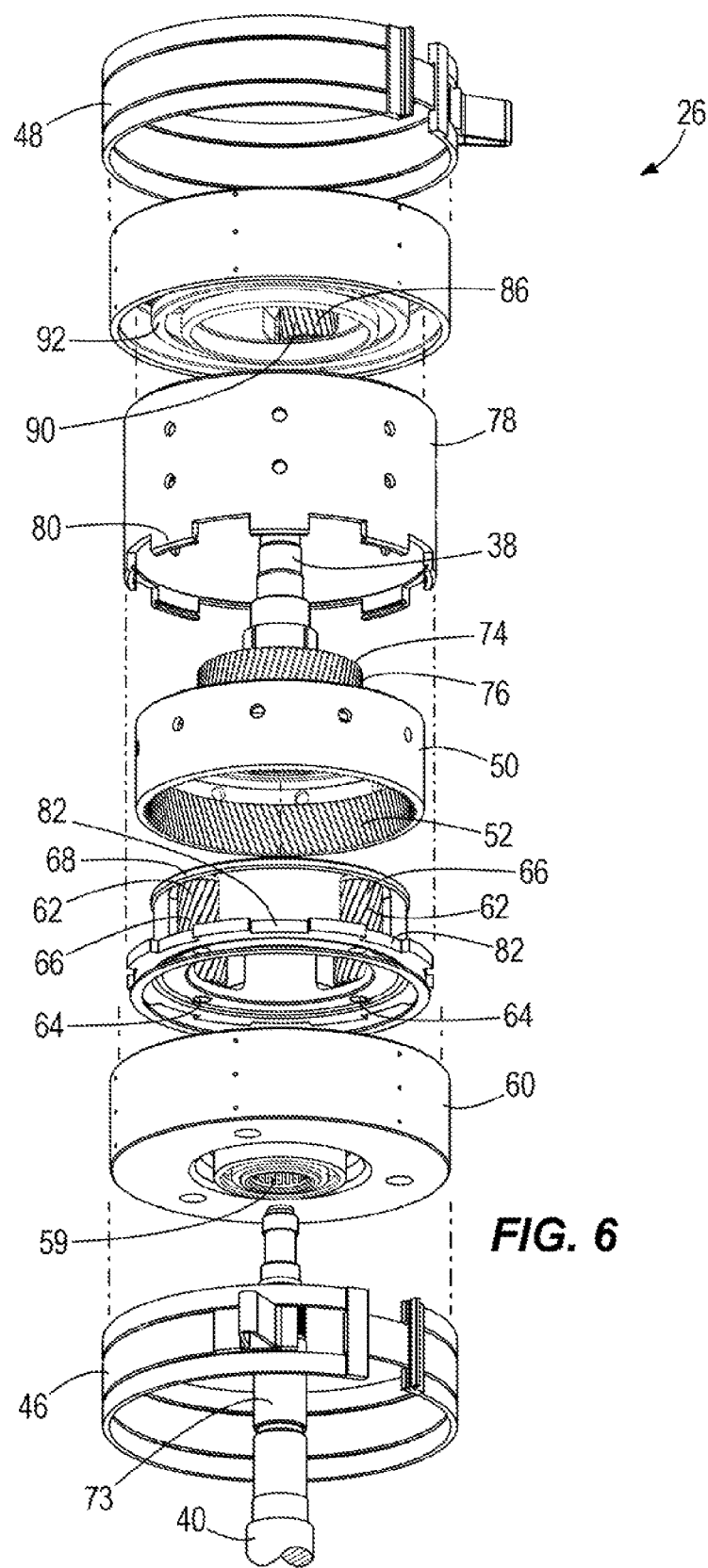

As shown in FIG. 2, a belt 108 connects the input shaft 38 to a lubrication pump 110 for providing lubrication, e.g. oil, to the transmission and propeller shaft housing 30. Thus the lubrication pump 110 will operate any time that the engine 18 is operating. A cooling water pump 112 is directly connected to the input shaft 38 such that rotation of the input shaft 38 causes the cooling water pump 112 to pump cooling water to the engine 18. Thus the cooling water pump 112 will operate any time that the engine 18 is operating. Neither the lubrication pump 110 nor the cooling water pump 112 will change their operation based upon a change in gear implemented by the transmission 26.

The components of the transmission 26 can be made of various materials, including metal, including steel and for example cast iron, which dissipates heat.

Advantageously the transmission 26 can be configured to provide the same speed reduction in both forward and reverse gears, have a high power density compared to prior art.

Advantageously the transmission 26 can sustain specified torque input, speed, shift cycles and transient conditions such as wave jump, throttle chop, and/or the like and still be located between the driveshaft housing 24 and the gearcase housing 32, for example within a minimum axial length, while still maintaining a hydrodynamic gearcase shape that minimizes drag.

FIGS. 13-18 depict a band brake actuation mechanism 200 that can be utilized in place of the arrangement shown in FIG. 7. The band brake actuation mechanism 200 includes a forward band brake actuator 202 for actuating the forward brake 46 and a reverse band brake actuator 204 for actuating the reverse brake 48. The forward and reverse band brake actuators 202, 204 have a similar construction. As such although FIGS. 14 and 15 only depict the forward band brake actuator 202, the drawings and description herein below of the forward band brake actuator 202 equally apply to the reverse band brake actuator 204.

Figure 13:
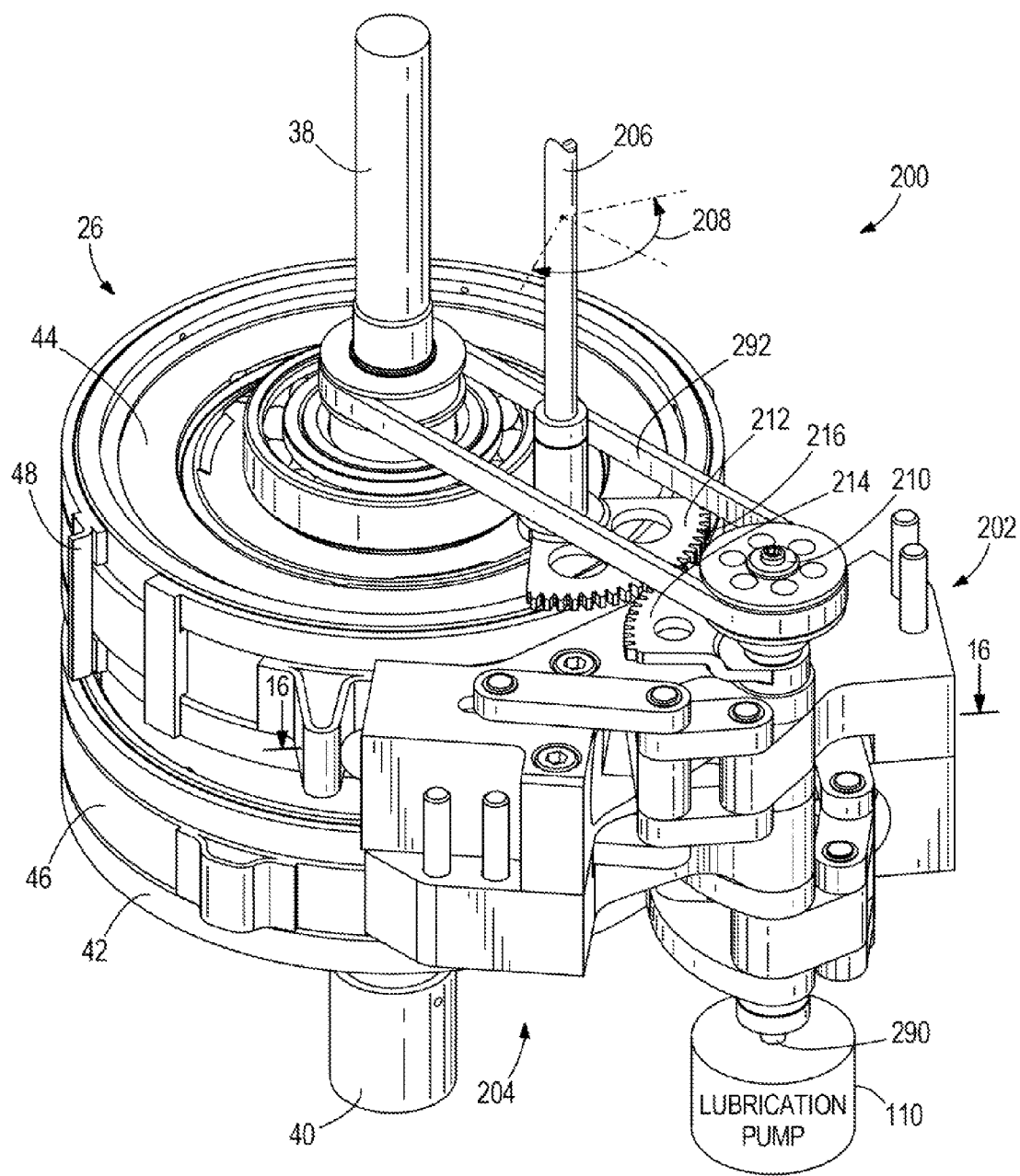
FIG. 13 is a perspective view of a pair of band brake actuation mechanisms for actuating band brakes on the transmission.

FIG. 13 depicts the band brake actuation mechanism 200 on above-described transmission 26 for the marine propulsion device 10 having the engine 18 that drives the propulsor 34 for propelling the marine vessel 12 in water. However it should be understood that the band brake actuator mechanism 200 is not limited for use with the exemplary transmission 26, and also can be used in combination with other transmission arrangements. As described herein above regarding FIGS. 2-6, the exemplary transmission 26 includes the input shaft 38 that is driven into rotation by the engine 18, the output shaft 40 that drives the propulsor 34 into rotation, and the forward and reverse planetary gearsets 42, 44 that connect the input shaft 38 to the output shaft 40. As described herein above regarding FIGS. 7-9, forward and reverse band brakes 46, 48 are disposed on the respective forward and reverse planetary gearsets 42, 44. Each band brake 46, 48 is movable between an active position wherein rotation of the input shaft 38 causes rotation of the output shaft 40 and an inactive position wherein rotation of the input shaft 38 does not cause rotation of the output shaft 40. The forward and reverse band brake actuators 202, 204 are configured to actuate the respective forward and reverse band brakes 46, 48, as further described herein below.

FIG. 13 depicts the lower end of a shift shaft 206 for actuating the band brake actuation mechanism 200. The configuration of this shift shaft 206 can vary from that which is shown. In this example, the shift shaft 206 extends parallel to the input shaft 38. A conventional shift shaft actuation mechanism (not shown) is provided at an upper end (not shown) of the shift shaft 206. Shift shaft actuation mechanisms are well known in the art can include one or a combination of mechanical, electrical and/or hydraulic devices that, upon an operator or computer command for a change in gear state of the transmission 200, causes the shift shaft 206 to rotate about its own axis. In one non-limiting example, the shift shaft 206 is rotatable by +/−40 degrees about its own axis, as shown at arrows 208. Rotation of the shift shaft 206 about its own axis in a first direction engages the forward band brake actuator 202 and rotation of the shift shaft 206 about its own axis in a second, opposite direction engages the reverse band brake actuator 204.

Figure 14:
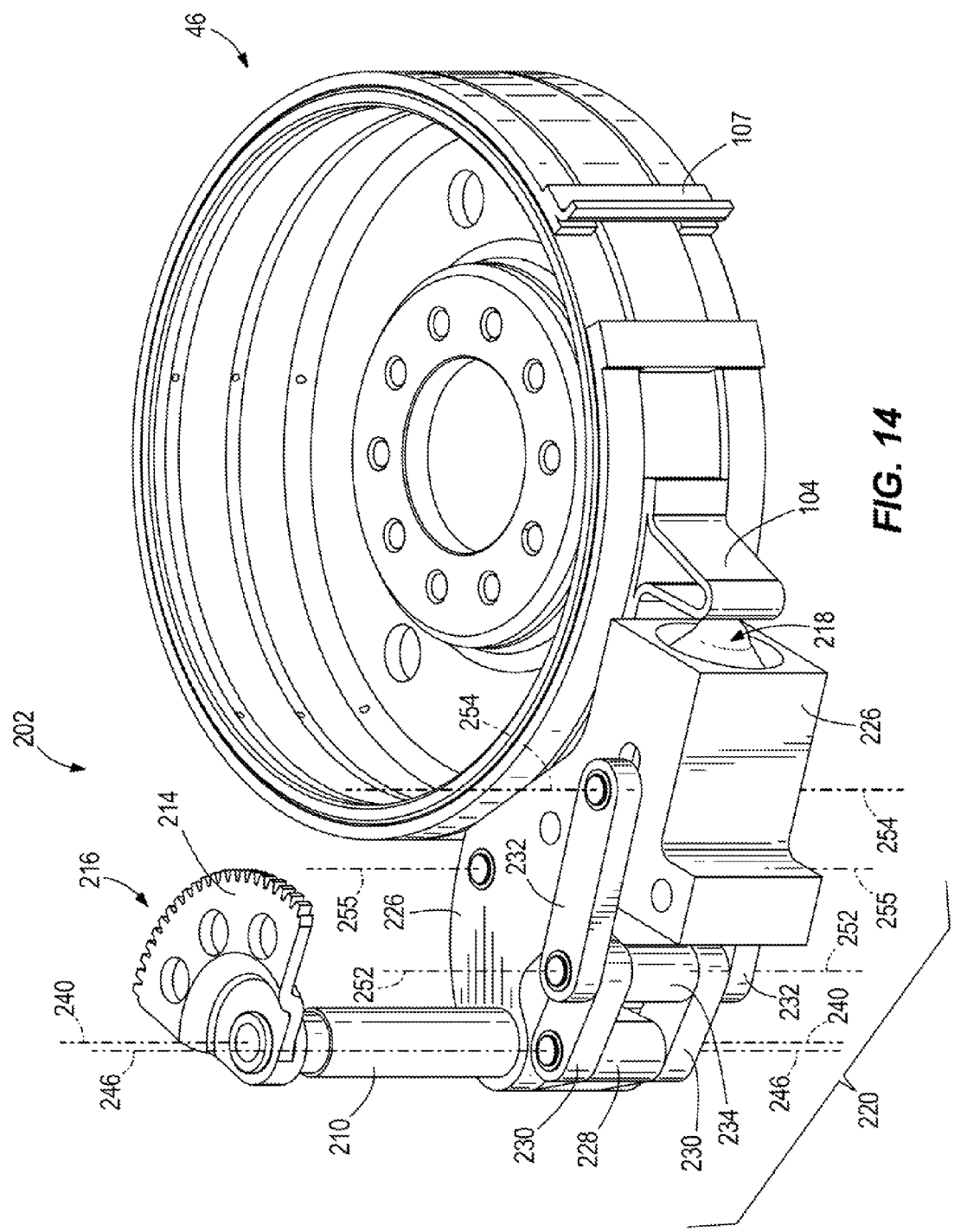
FIG. 14 is a perspective view of a forward band brake actuator for actuating a forward band brake on the transmission.

Referring to FIGS. 13 and 14, an actuator shaft 210 extends through the band brake actuator mechanism 200, and more particularly through both of the forward and reverse band brake actuators 202, 204. In this example, the actuator shaft 210 extends parallel to the shift shaft 206 and is engaged with the shift shaft 206 such that rotation of the shift shaft 206 causes rotation of the actuator shaft 210. The connection between the shift shaft 206 and actuator shaft 210 can be accomplished in any one of a variety of ways. In this example, a first sector gear 212 is attached to and radially extends from the shift shaft 206 and a second sector gear 214 is attached to and radially extends from the actuator shaft 210. The first and second sector gears 212, 214 have peripherally outer surfaces that face each other. The first and second sector gears 212, 214 have teeth 216 that mate with each other such that rotation of the shift shaft 206 and first sector gear 212 causes rotation of the second sector gear 214 and actuator shaft 210. Thus it can be seen that the noted shift actuation mechanism (not shown) causes rotation of the shift shaft 206, which in turn causes rotation of the actuator shaft 210 via the sector gears 212, 214 to thereby actuate the forward and reverse band brake actuators 202, 204, as will be described further herein below.

As shown in FIG. 13, the lubrication pump 110 is connected to a pump shaft 290 that coaxially extends with the actuator shaft 210. The pump shaft 290 thus extends through the band brake actuation mechanism 200. The pump shaft 290 is driven into rotation by a band 292 that is connected to the input shaft 38 for the noted transmission.

Figure 15:
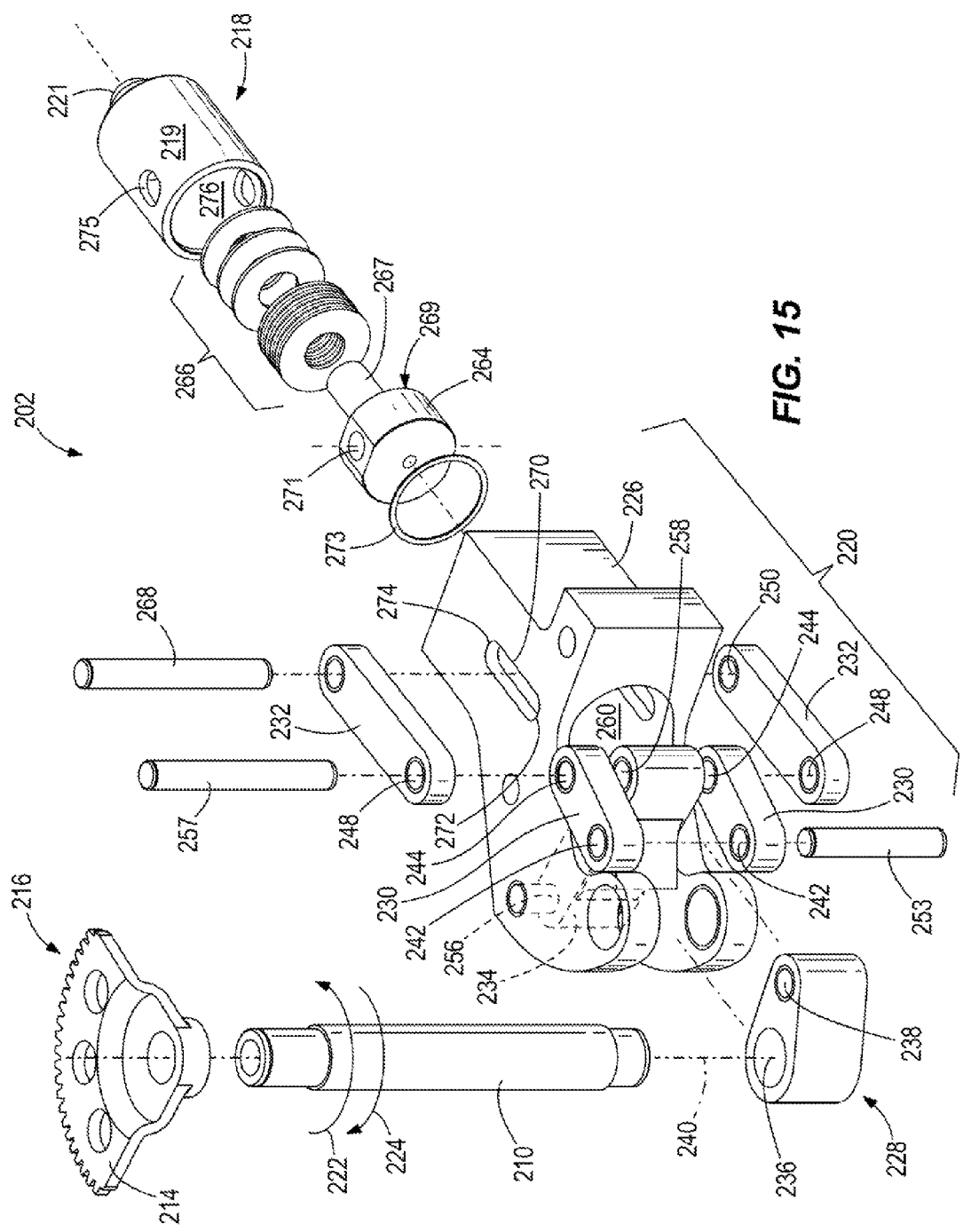
FIG. 15 is an exploded view of the forward band brake actuator.

FIGS. 14 and 15 depict the band brake actuation mechanism 200 wherein only the forward band brake actuator 202 is shown. As discussed above the forward and reverse band brake actuators 202, 204 have the same construction and therefore the following description of the forward band brake actuator 202 equally applies to the reverse band brake actuator 204. The forward band brake actuator 202 includes an output finger 218 and a linkage assembly 220 that connects the actuator shaft 210 to the output finger 218 such that rotation of the actuator shaft 210 in a first direction (shown at arrow 222 in FIG. 15) causes the output finger 218 to engage the band brake 46 on the forward planetary gearset 42 and such that rotation of the actuator shaft 210 in an opposite, second rotation direction (shown at arrow 224 in FIG. 15) causes the output finger 218 to disengage the band brake 46 from the forward planetary gearset 42. As explained herein above, engagement and disengagement of the band brake 46 with the forward planetary gearset 42 causes the planetary gearset to shift into and out of forward gear, respectively.

As explained further herein below regarding FIGS. 16-18, the linkage assembly 220 is configured such that application of a constant input torque on the actuator shaft 210 via the shift shaft 206 results in non-uniform output forces on the output finger 218 and thus the forward band brake 46 and brake drum 60.

Figure 17:
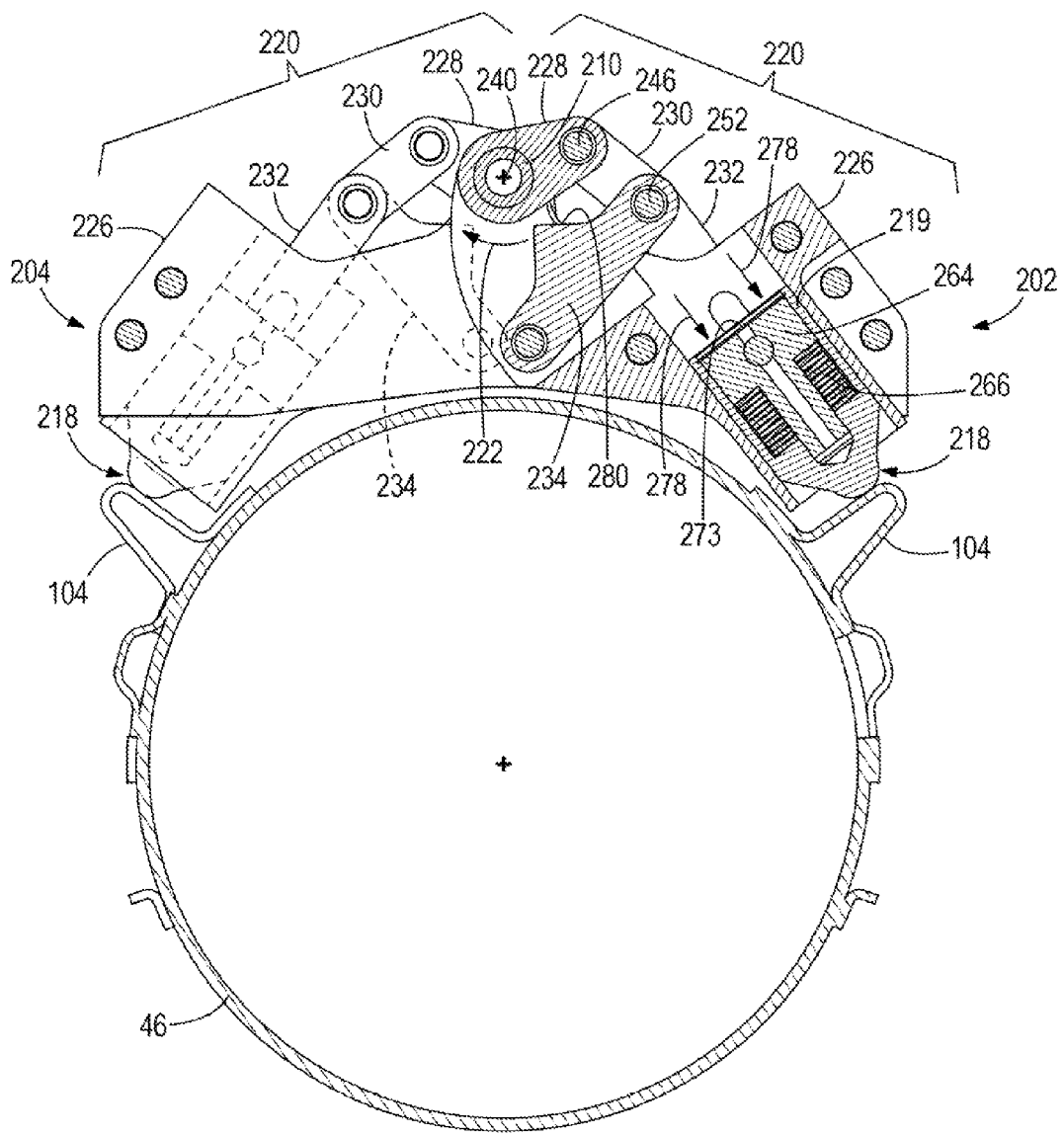
FIG. 17 is a partially sectioned top view of the forward band brake actuator in a neutral position.
Figure 18:
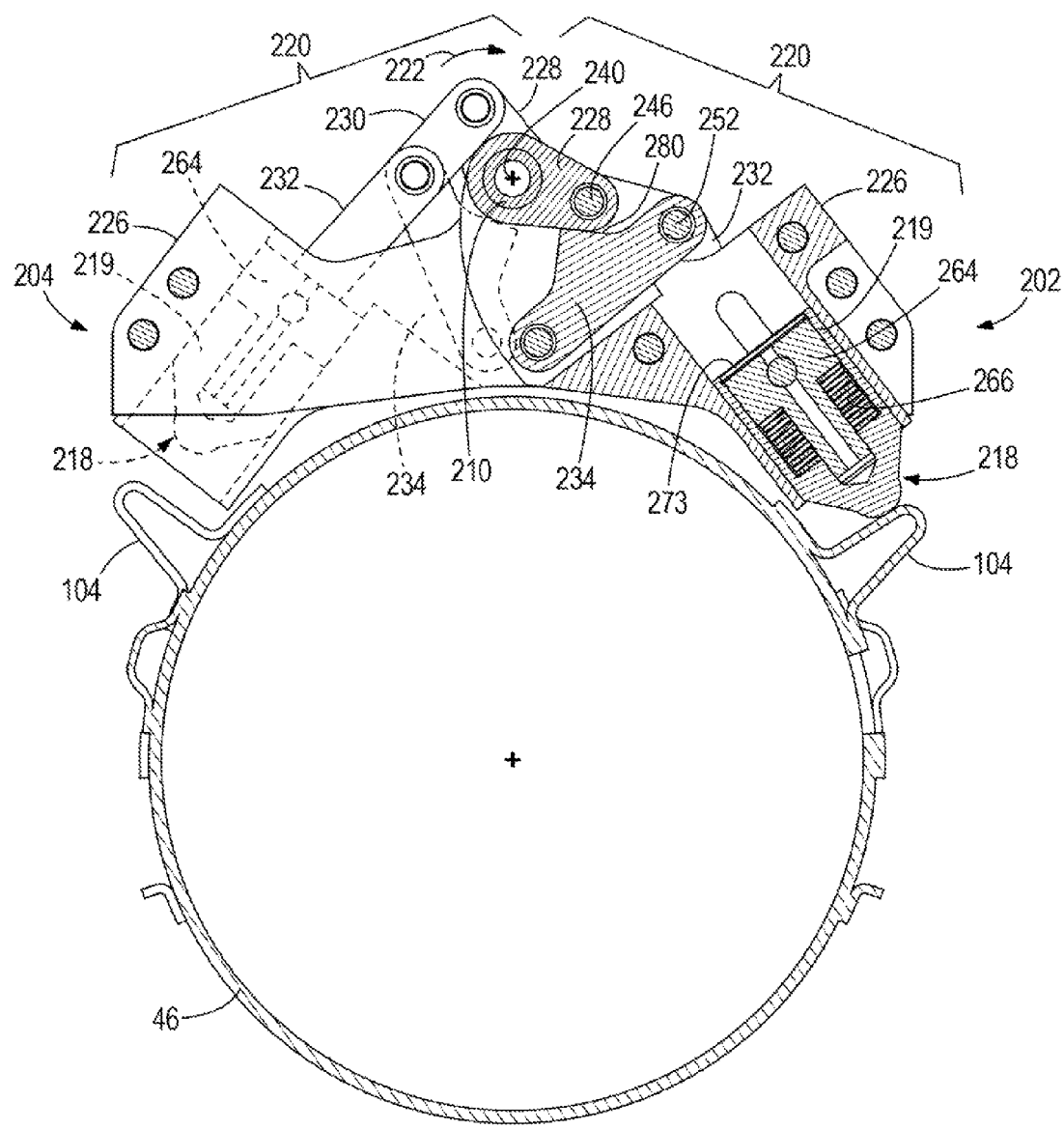
FIG. 18 is a partially sectioned top view of the forward band brake actuator in an engaged position.

Rotation of the actuator shaft 210 in the first rotation direction 222 causes the linkage assembly 220 and output finger 218 to translate from a disengaged position (FIG. 16) to a neutral position (FIG. 17) and from the neutral position to an engaged position (FIG. 18). Rotation of the actuator shaft in the opposite, second rotation direction 224 causes the linkage assembly 220 to translate from the noted engaged position to the neutral position and from the neutral position to the disengaged position.

In the example shown in FIGS. 14 and 15, the linkage assembly 220 includes a housing 226 and a plurality of links, including an input crank 228, a pair of connecting links 230, a pair of connecting rods 232, and an output crank 234. The input crank 228 has a first input crank pivot point 236 and an opposite, second input crank pivot point 238. The first input crank pivot point 236 is connected to and rotates with the actuator shaft 210 at a first pivot axis 240. The first pivot axis 240 is shown in FIG. 14 and coextends with the center axis of the actuator shaft 210. The first and second input crank pivot points 236, 238 are shown in FIG. 15. The connecting links 230 each have a first connecting link pivot point 242 and an opposite, second connecting link pivot point 244. The first connecting link pivot point 242 is pivotably connected to the second input crank pivot point 238 at a second pivot axis 246, shown in FIG. 14. The first and second connecting link pivot points 242, 244 are shown in FIG. 15. Each connecting rod 232 has a first connecting rod pivot point 248 and an opposite, second connecting rod pivot point 250. The first connecting rod pivot point 248 is pivotably connected to the second connecting link pivot point 244 at a third pivot axis 252. The third pivot axis 252 is shown in FIG. 14 and the first and second connecting rod pivot points 248, 250 are shown in FIG. 15. Pivot pins 253, 257 (see FIG. 15) support the pair of connecting links 230 at the first and second connecting link pivot points 242, 244. Pivot pin 253 supports the input crank 228 at the second input crank pivot point 238. The second connecting rod pivot point 250 is pivotably connected to the output finger 218 via a slider and spring mechanism, which will be further explained herein below. The second connecting rod pivot point 250 is pivotably connected at a fourth pivot axis 254. The fourth pivot axis 254 is shown in FIG. 14. The output crank 234 has a first output crank pivot point 256 and a second output crank pivot point 258. Pivot pin 257 supports the output crank 234 at the second output crank pivot point 258 and the connecting rods 232 at the first connecting rod pivot point 248. The first output crank pivot point 256 is pivotably connected to the housing 226 at a fifth pivot axis 255. The fifth pivot axis is shown in FIG. 14, while the first and second output crank pivot points 256, 258 are shown in FIG. 15. The second output crank pivot point 258 is pivotably connected to the second connecting link pivot point 244 and the first connecting rod pivot point 248 at the third pivot axis 252.

It will be recognized that the construction of the linkage assembly 220 can vary from that which is shown. For example it is not essential to include pairs of connecting links and connecting rods. One connecting link and one connecting rod or more than two connecting links and/or connecting rods could be utilized. In other examples, the number and orientation of each of the plurality of links in the linkage assembly 220 can vary from that which is shown.

Referring to FIG. 15, the housing 226 defines a cavity 260 out of and into which the output finger 218 axially reciprocates so as to engage and disengage the band brake 46, respectfully. In this example, the output finger 218 includes an output cylinder 219 that is slideably received in the cavity 260 and a nipple 221 that extends from the end of the output cylinder 219. A slider 264 and a spring 266 are disposed in a cavity 276 of the output cylinder 219. In this example, the spring 266 is a Belleville spring that includes a plurality of washers that are sandwiched between the output finger 218 and the slider 264. The slider 264 has an axially extending center post 267 on which the washers are disposed. The spring 266 biases the slider 264 and the output finger 262 away from each other so as to provide compliance between the slider 264 and output finger 262 when the output finger 262 is pressed against the apply bracket 104 of the forward band brake 46. More specifically, one side of the plurality of washers bears against a bearing surface 269 of the slider 264 and an opposite side of the plurality of washers bears on the interior of the output cylinder 219. A snap ring 276 retains the slider 264 and it keep spring prestroked (preloaded). A slider pin 268 extends through an axial slot 270 formed in the housing 226, an elongated through-slot 275 formed in the output cylinder 219, and a through-hole 271 formed in the slider 264. The slider pin 268 slides back and forth in the axial slot 270 under force from the linkage assembly 220, which in turn causes the slider 264 and output finger 219 reciprocate in the cavity 260. The axial slot 270 has a first slot end 272 that determines a retracted axial position to which the slider 264 moves towards the linkage assembly 220 (FIG. 16) and an opposite, second slot end 274 that determines an opposite extended axial position to which the slider 264 moves away from the linkage assembly 220 (FIG. 18). The slider pin 268 engages the first slot end 272 when the slider 264 reaches the retracted axial position. The slider pin 268 engages with the second slot end 274 when the slider 264 reaches the retracted axial position.

Figure 16:
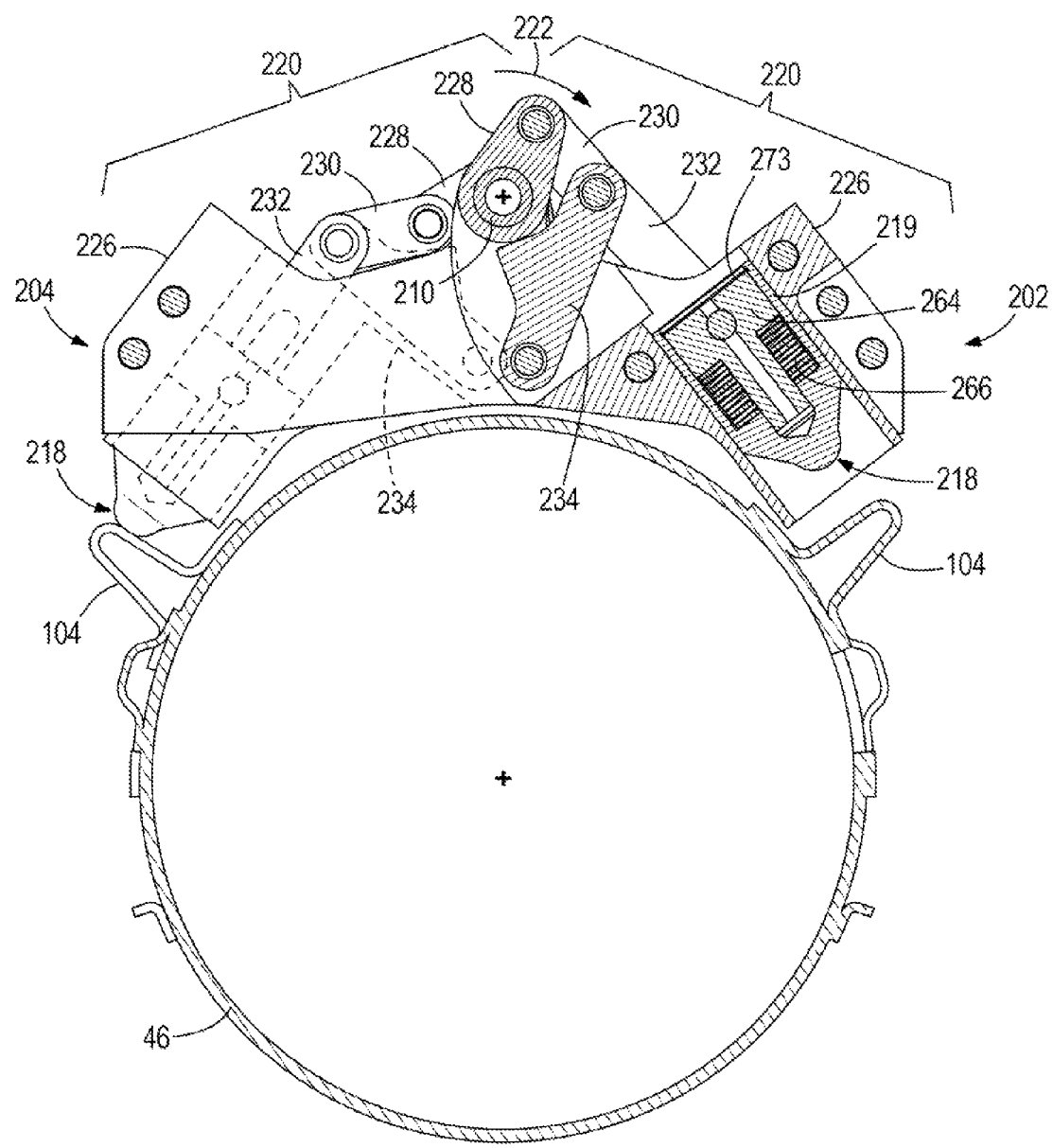
FIG. 16 is a partially sectioned top view of the forward band brake actuator in a disengaged position.

When viewed in succession, FIGS. 16-18 depict the forward band brake actuator 202 during application of an input torque on the actuator shaft 210 in the noted first rotation direction 222, which as discussed further herein below results in non-uniform output forces on the output finger 262. When viewed in succession, FIGS. 18-16 depict the forward band brake actuator 202 during application of input torque on the actuator shaft 210 in the noted second rotation direction 224, which as discussed further herein below results in non-uniform output forces on the output finger 262. As explained herein above regarding FIGS. 7-9, movement of the output finger 262 against the apply bracket 104 tightens the forward band break 46 about the brake drum 60, thus preventing the brake drum 60 from rotating, and enacting a gear change.

Figure 19:
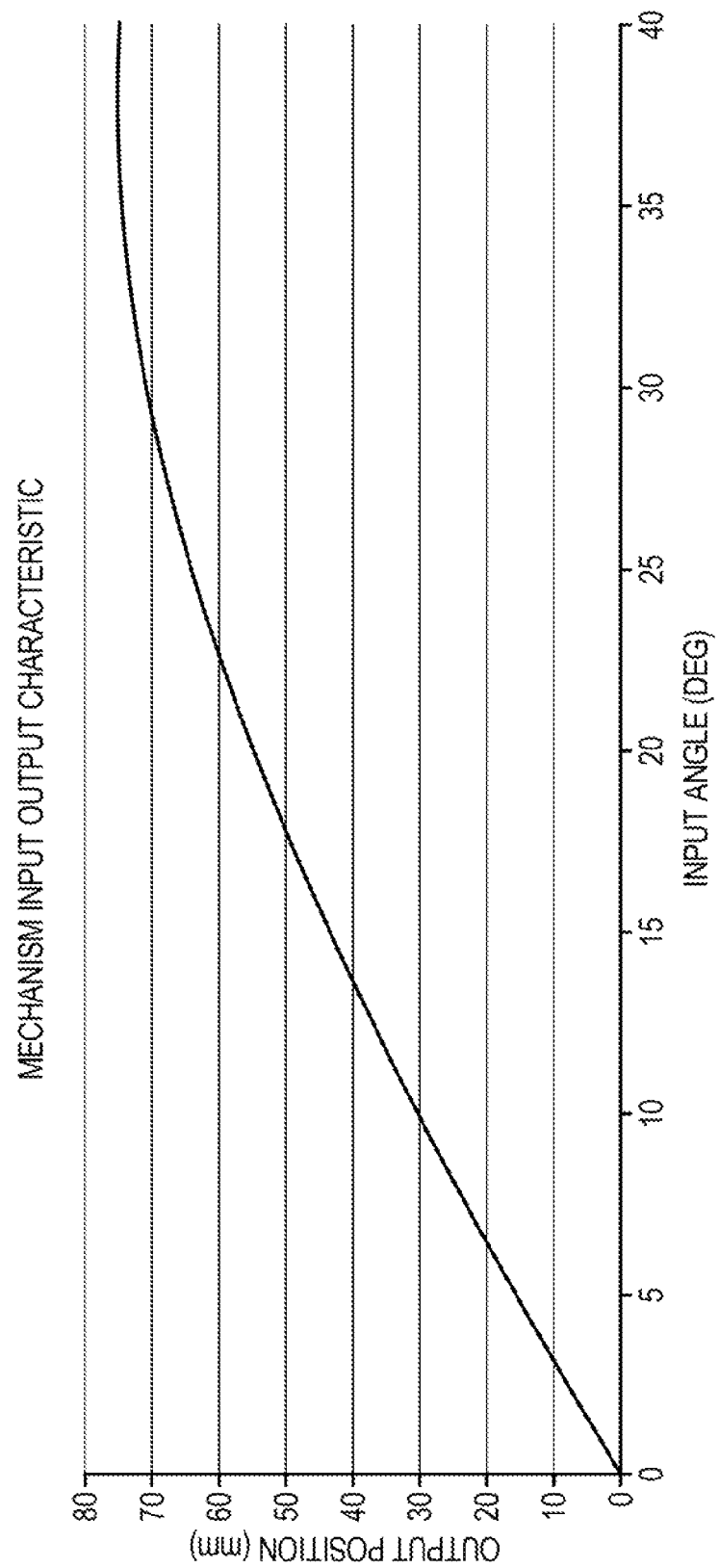
FIG. 19 is a graph depicting input-output characteristics of the forward band brake actuator.
Figure 20:
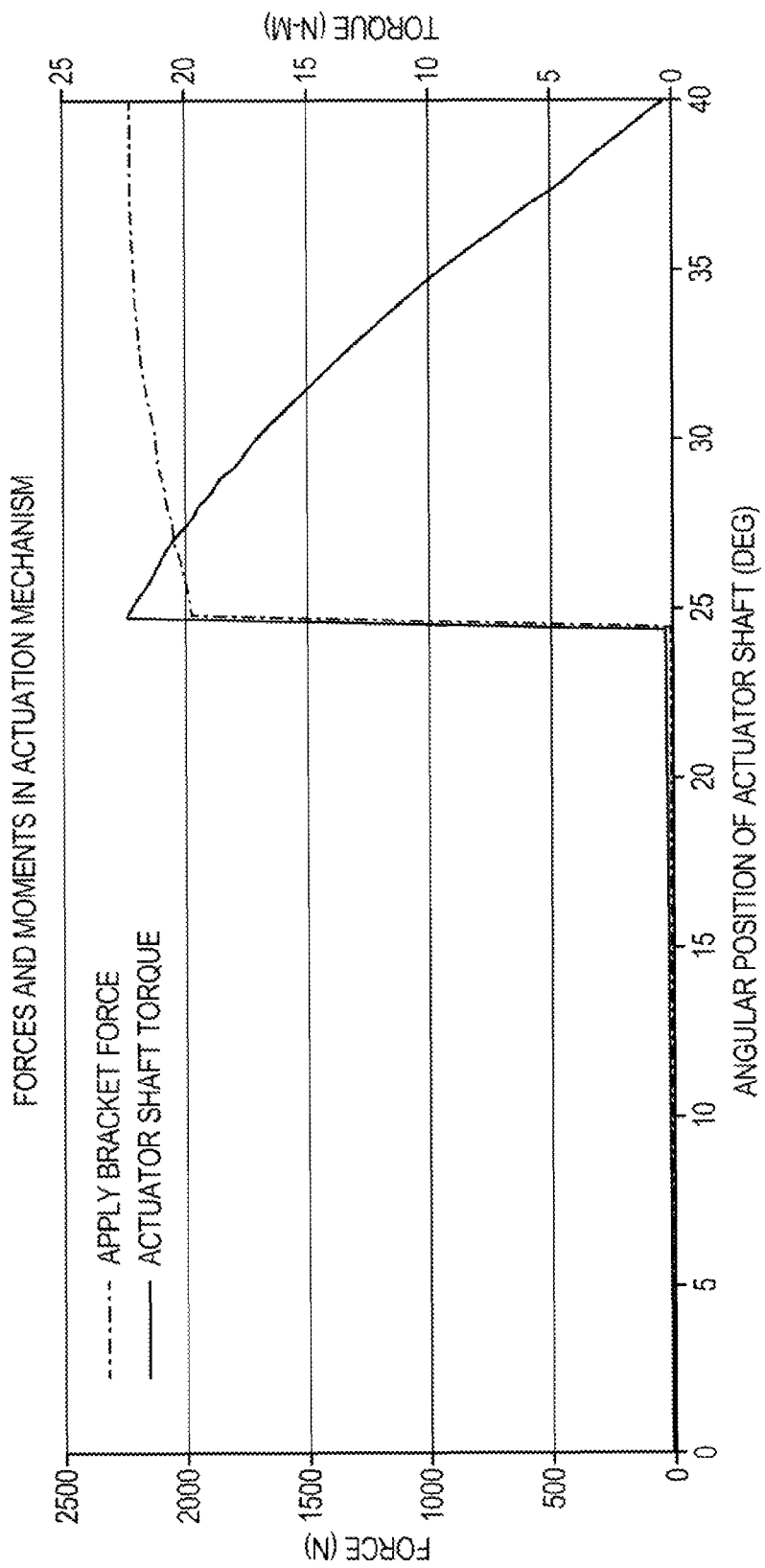
FIG. 20 is a graph depicting forces and moments on the forward band brake actuator.

FIG. 16 depicts the forward band brake actuator 202 in a disengaged state wherein the output finger 218 is retracted into the cavity 260 such that it is disengaged from the apply bracket 104 of the forward band brake 46. By comparing FIGS. 16 and 17 it can be seen that rotation of the actuator shaft 210 in the first rotation direction 222 causes rotation of the input crank 228 about the first pivot axis 240. This causes pivoting and axial translation of the pair of connecting links 230 and the pair of connecting rods 232, which in turn causes axial translation of the slider 264 in the cavity 264, via the connection between the connecting rods 232 and slider 264 at slider pin 268. As the slider 264 translates in the cavity 260 in the direction of arrows 278, the slider pin 268 slides along axial slot 270. Slider 264 pushes on the spring 266, which in turn pushes on the output cylinder 219 of the output finger 218. When the output finger 218 engages the apply bracket 104, as shown in FIG. 17, the slider pin 268 slides within the through-slot 269 formed in the output cylinder 219 as compliance is provided between the slider 264 and output finger 218. As shown by comparing FIGS. 17 and 18, continued rotation of the actuator shaft 210 causes the output crank 234 to move between the first pivot axis 240 and the third pivot axis 252. FIG. 17 shows the linkage assembly 220 prior to when the second pivot axis 246 passes between the first pivot axis 240 and the third pivot axis 252. FIG. 18 shows the linkage assembly 220 after the second pivot axis 246 has passed between the first pivot axis 240 and the third pivot axis 252. As the second pivot axis 246 passes between the first pivot axis 240 and third pivot axis 252 it encounters an overcenter mechanism, as explained further herein below. With reference to FIGS. 19 and 20, travel of the linkage assembly 220 from the disengaged position (FIG. 16) to the neutral position (FIG. 17) provides a relatively low force per traveled distance. As the linkage assembly 220 approaches the overcenter mechanism, less travel results in favor of a larger output force at the output finger 262. This advantageously provides a mechanical gain that enables the band brake actuator 202 to output a relatively large force on the apply bracket 104, which provides a relatively large clamping force on the brake drum with respect to a relatively low torque force on the shift shaft 206 and actuator shaft 210.

As shown in FIG. 18, continued rotation of the actuator shaft 210 causes the output crank 234 to engage a stopper surface 280 on the output crank 234 as the linkage assembly 220 is moved into the engaged position. Advantageously, the force of the noted overcenter mechanism retains the linkage assembly 220 in this position. Rotation of the actuator shaft 210 in the second rotation direction 224 (shown in FIG. 1S) must be caused by a torque that is sufficient to overcome the retention force provided by the overcentered mechanism as the second pivot axis 246 moves back between the first pivot axis 240 and third pivot axis 252, as shown by comparison of FIGS. 18 to 17.

The input crank 228, connecting links 230 and output crank 234 are connected to the housing 226 and can be referred to as a "four-bar mechanism". The output crank 234, connecting rods 232 and slider 264 can be referred to as an offset slider crank mechanism, where the slider 264 engages with the spring 266 to push the output finger 262 and thereby provide the desired range of motion, high-clamping force and wear compensation.

As mentioned herein above, FIG. 19 is a graph depicting output position of the linkage assembly 220 versus input angle of rotation, as determined by rotation of the shift shaft 206 as shown at arrow 208. FIG. 19 illustrates that change in output position of the linkage assembly 220 is not linear with respect to change in input angle.

FIG. 20 is a graph depicting output force of the linkage assembly 220 versus input angle of the actuator shaft 210, as determined by rotation of the shift shaft 206 at arrows 208. FIG. 20 shows that initial rotation of the actuator shaft 210 results in a relatively large amount of travel of the linkage assembly 220 with relatively low output force. Continued rotation of the actuator shaft 210 through the overcenter mechanism described herein above results in relatively small amount of travel and large output force. Once the linkage assembly 220 travels past the overcenter mechanism, the output force steadily decreases.

Per the construction of the actuation mechanism 200, a constant input torque on the actuator shaft 210 results in non-uniform band engagement force during the engagement and disengagement. As shown in FIGS. 20-23, the actuator force is very small for the initial rotation of the actuator shaft 210 until it reaches about 24 degrees. During this time the actuator shaft 210 is rotating but there is little resistive force. The brake band 46 is deflecting but not exerting high forces on the gearset 42. At about 25 degrees rotation the actuator force increases as it resists the reaction force of the brake band 46 as it tightens around the brake drum 60. As the brake band 46 is tightened around the brake drum 60 the finger 218 loses the ability to move while actuator shaft 210 is still turning and causes the compression of the spring 266 via the noted mechanism linkages. The snap ring 273 maintains the preload of the springs 266 to obtain a set force. Due to the spring reaction the actuator force rises until it is in the noted over-center position. The spring 266 provides force to the linkage 232 to cause rotation of output crank 234 until it touches 280 stopper surface of input crank 228. After the over-center position the actuator torque is lowered since the reaction force is contained in the mechanism, which is in the locked position. Then the brake band 46 is fully engaged. FIGS. 21, 22, 23 schematically illustrate the actuation mechanism 200 as it moves past the over-center position (shown in FIG. 22).

Thus it will be seen by one having ordinary skill in the art that the present disclosure thus provides a transmission assembly that includes at least one, in some examples two planetary gearsets that can be stacked one on top of the other and connected in such a way to provide forward, neutral and reverse functions. An actuation assembly is provided that includes two similar or identical actuators fixed to a transmission housing and sharing a common actuator shaft. In certain examples, the assembly can be located forward of the transmission to advantageously provide a narrow, streamlined hydrodynamic profile in an outboard motor assembly. The arrangement can have first and second sector gears. The first sector gear can be connected to and rotate with the shift shaft 206 and provide the actuation motion and forces necessary to control the transmission. The second sector gear can be connected to and rotate with the noted actuator shaft in the actuation assembly and receive the motion and forces necessary to control the transmission unit. In certain examples, the ratio between the two sector gears can be 1:1.

In certain examples, the forward and reverse band brakes 46, 48 can include a double wrap band that is oriented to be energized by brake drum torque when the transmission is in drive mode. Other possible configurations are single wrap versus double wrap and de-energized versus energized. The brake drums can be a cylindrical feature of the transmission connected to the forward sun gear which, when held, places the transmission into gear and when released allows the transmission to be in neutral or an opposite gear. One end of the brake band can fit into a slot on the transmission housing that is configured to prevent it from moving tangentially about the brake drum, but does allow it to move radially away from the drum when released and radially towards the drum when applied. The other end of the band can be acted upon by the respective brake actuator to cause it to apply or release.

The exemplary arrangements can operate in several operation modes, including forward, neutral and reverse. In forward, the shift shaft 206 can be rotated at negative 40 degrees while the forward band brake is applied. When the internal combustion engine drives the transmission input shaft and there is a resistance on the output shaft, the forward brake drum will rotate in the anti-clockwise direction. The forward band brake actuator pushes the forward band brake at its free end in the anti-clockwise direction, which energizes the band brake and causes it to wrap tight around the brake drum. The band and the brake drum can be prevented from rotating by a reaction force at the band brake fixed end. In neutral mode, the shift shaft 206 is at zero degrees, with no brake mechanism applied. When the internal combustion engine drives the transmission input shaft and there is a resistance on the output shaft, the forward brake drum will rotate in the anti-clockwise direction and the reverse brake drum will rotate in the clockwise direction. There are no reaction forces available, so the transmission is set in neutral gear. In reverse mode, the shift shaft 206 is rotated at positive 40 degrees with the reverse band brake applied. When the internal combustion engine drives the transmission input shaft and there is a resistance on the output shaft, the reverse brake drum will rotate in the clockwise direction. The reverse band brake actuator pushes the reverse band free and in the clockwise direction, which energizes the band brake and causes it to wrap tight around the brake drum. The band and the brake drum are prevented from rotating by a reaction force at the band fixed end.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

What is claimed is:

1. A band brake actuator for actuating a band brake on a planetary gearset, the band brake actuator comprising:
   an actuator shaft;
   an output finger; and
   a linkage assembly that connects the actuator shaft to the output finger such that rotation of the actuator shaft in a first rotation direction causes the output finger to engage the band brake on the planetary gearset, and such that rotation of the actuator shaft in an opposite, second rotation direction causes the output finger to disengage the band brake from the planetary gearset;
   wherein engagement of the band brake and the planetary gearset shifts the planetary gearset into one of a forward and a reverse gear and wherein disengagement of the band brake and the planetary gearset shifts the planetary gearset into a neutral gear; and
   wherein rotation of the actuator shaft in the first rotation direction causes the output finger to axially translate in a first axial direction towards the band brake, and wherein rotation of the actuator shaft in the second rotation direction causes the output finger to axially translate in a second, opposite axial direction away from the band brake.

2. The band brake actuator according to claim 1, further comprising a housing that houses the output finger, wherein the housing defines a cavity out of and into which the finger axially reciprocates so as to engage and disengage the band brake, respectfully.

3. The band brake actuator according to claim 2, further comprising a slider and a spring that are disposed in the cavity, wherein the spring biases the slider and the output finger away from each other so as to provide compliance between the slider and output finger, and wherein the linkage assembly causes the slider to axially reciprocate in the cavity.

4. The band brake actuator according to claim 3, wherein the spring comprises a Belleville spring.

5. The band brake actuator according to claim 4, further comprising a slider pin connected to the slider and an axial slot formed in the housing, wherein the slider pin slides in the axial slot as the slider axially reciprocates in the cavity.

6. The band brake according to claim 5, wherein the axial slot comprises a first slot end that determines a retracted axial position to which the slider moves towards the linkage assembly and an opposite second slot end that determines an opposite extended axial position to which the output finger moves away from the linkage assembly, and wherein the slider pin engages with the first slot end when the slider reaches the retracted axial position and wherein the slider pin engages with the second slot end when the slider reaches the retracted axial position.

7. The band brake actuator according to claim 1, wherein the linkage assembly is configured such that application of a constant input torque on the actuator shaft results in non-uniform output forces on the band brake.

8. The band brake actuator according to claim 7, wherein rotation of the actuator shaft in the first rotation direction causes the linkage assembly to translate from a disengaged position to a neutral position and from the neutral position to an engaged position, and wherein rotation of the actuator shaft in the second rotation direction causes the linkage assembly to translate from the engaged position to the neutral position and from the neutral position to the disengaged position.

9. The band brake actuator according to claim 8, wherein the linkage assembly encounters an overcenter mechanism as the linkage assembly translates from the neutral position to the engaged position.

10. The band brake actuator according to claim 8, wherein the linkage assembly comprises a four bar linkage.

11. The band brake actuator according to claim 8, wherein the linkage assembly comprises:
a housing;
an input crank having a first input crank pivot point and an opposite second input crank pivot point, wherein the first input crank pivot point is connected to and rotates with the actuator shaft at a first pivot axis;
a connecting link having a first connecting link pivot point and an opposite second connecting link pivot point, wherein the first connecting link pivot point is pivotably connected to the second input crank pivot point at a second pivot axis;
a connecting rod having a first connecting rod pivot point and an opposite second connecting rod pivot point, wherein the first connecting rod pivot point is pivotably connected to the second connecting link pivot point at a third pivot axis and wherein the second connecting rod pivot point is pivotably coupled to the output finger at a fourth pivot axis; and
an output crank having a first output crank pivot point and a second output crank pivot point, wherein the first output crank pivot point is pivotably connected to the housing and wherein the second output crank pivot point is pivotably connected to the second connecting link pivot point and the first connecting rod pivot point at the third pivot axis.

12. The band brake actuator according to claim 11, wherein rotation of the actuator shaft in the first rotation direction causes the input crank to rotate such that the second pivot axis moves between the first and third pivot axes.

13. The band brake actuator according to claim 12, wherein the second pivot axis passes through an overcenter mechanism when the second pivot axis moves between the first and third pivot axes.

14. The band brake actuator according to claim 13, wherein the overcenter mechanism retains the linkage assembly in the engaged position.

15. A transmission for a marine propulsion device having an internal combustion engine that drives a propulsor for propelling a marine vessel in water, the transmission comprising:
an input shaft that is driven into rotation by the engine;
an output shaft that drives the propulsor into rotation;
a planetary gearset that connects the input shaft to the output shaft;
a band brake on the planetary gearset, wherein the band brake is movable between
an active position wherein rotation of the input shaft causes rotation of the output shaft;
an inactive position wherein rotation of the input shaft does not cause rotation of the output shaft; and
a band brake actuator for actuating a band brake on a planetary gearset, the band brake actuator comprising:
an actuator shaft;
an output finger; and
a linkage assembly that connects the actuator shaft to the output finger such that rotation of the actuator shaft in a first rotation direction causes the output finger to engage the band brake on the planetary gearset, and such that rotation of the input shaft in an opposite, second rotation direction causes the output finger to disengage the band brake from the planetary gearset;
wherein engagement of the band brake and the planetary gearset shifts the planetary gearset into one of a forward and a reverse gear and wherein disengagement of the band brake and the planetary gearset shifts the planetary gearset into a neutral gear; and
a belt that connects the input shaft to a lubrication pump such that rotation of the input shaft powers the lubrication pump, wherein the belt comprises a first end on the input shaft and a second end on a pump shaft, wherein the pump shaft extends through the band brake actuator.

16. The transmission according to claim 15, further comprising a shift shaft that extends parallel to the actuator shaft, wherein rotation of the shift shaft causes rotation of the actuator shaft.

17. The transmission according to claim 16, further comprising a first sector gear that rotates with the shift shaft and a second sector gear that rotates with the actuator shaft, wherein the first and second sector gears are engaged so that rotation of the first sector gear causes rotation of the second sector gear.

18. A band brake actuator for actuating a band brake on a planetary gearset, the band brake actuator comprising:
an actuator shaft;
an output finger; and
a linkage assembly that connects the actuator shaft to the output finger such that rotation of the actuator shaft in a first rotation direction causes the output finger to engage the band brake on the planetary gearset, and such that rotation of the actuator shaft in an opposite, second rotation direction causes the output finger to disengage the band brake from the planetary gearset;

wherein engagement of the band brake and the planetary gearset shifts the planetary gearset into one of a forward and a reverse gear and wherein disengagement of the band brake and the planetary gearset shifts the planetary gearset into a neutral gear;

wherein rotation of the actuator shaft in the first rotation direction causes the linkage assembly to translate from a disengaged position to a neutral position and from the neutral position to an engaged position, and wherein rotation of the actuator shaft in the second rotation direction causes the linkage assembly to translate from the engaged position to the neutral position and from the neutral position to the disengaged position;

wherein the linkage assembly is configured such that application of a constant input torque on the actuator shaft results in non-uniform output forces on the band brake; and wherein the linkage assembly encounters an overcenter mechanism as the linkage assembly translates from the neutral position to the engaged position.

19. The band brake actuator according to claim 18, wherein the linkage assembly comprises:

a housing;

an input crank having a first input crank pivot point and an opposite second input crank pivot point, wherein the first input crank pivot point is connected to and rotates with the actuator shaft at a first pivot axis;

a connecting link having a first connecting link pivot point and an opposite second connecting link pivot point, wherein the first connecting link pivot point is pivotably connected to the second input crank pivot point at a second pivot axis;

a connecting rod having a first connecting rod pivot point and an opposite second connecting rod pivot point, wherein the first connecting rod pivot point is pivotably connected to the second connecting link pivot point at a third pivot axis and wherein the second connecting rod pivot point is pivotably coupled to the output finger at a fourth pivot axis; and an output crank having a first output crank pivot point and a second output crank pivot point, wherein the first output crank pivot point is pivotably connected to the housing and wherein the second output crank pivot point is pivotably connected to the second connecting link pivot point and the first connecting rod pivot point at the third pivot axis.

20. The band brake actuator according to claim 19, wherein rotation of the actuator shaft in the first rotation direction causes the input crank to rotate such that the second pivot axis moves between the first and third pivot axes.

21. The band brake actuator according to claim 20, wherein the second pivot axis passes through an overcenter mechanism when the second pivot axis moves between the first and third pivot axes.

22. The band brake actuator according to claim 21, wherein the overcenter mechanism retains the linkage assembly in the engaged position.

23. The band brake actuator according to claim 8, wherein the linkage assembly comprises an offset slider crank mechanism.

* * * * *